US010949058B1

(12) United States Patent
Andersen et al.

(10) Patent No.: US 10,949,058 B1
(45) Date of Patent: Mar. 16, 2021

(54) GENERATING AND MANIPULATING THREE-DIMENSIONAL (3D) OBJECTS IN A 3D ENVIRONMENT OF AN ALTERNATIVE REALITY SOFTWARE APPLICATION

(71) Applicant: FMR LLC, Boston, MA (US)

(72) Inventors: James Andersen, Cary, NC (US); Hangyu Wang, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/011,779

(22) Filed: Sep. 3, 2020

(51) Int. Cl.
*G06F 3/0481* (2013.01)
*G06F 3/0484* (2013.01)
*G02B 27/01* (2006.01)
*G06F 3/01* (2006.01)

(52) U.S. Cl.
CPC ..... *G06F 3/04815* (2013.01); *G02B 27/0172* (2013.01); *G06F 3/011* (2013.01); *G06F 3/017* (2013.01); *G06F 3/04847* (2013.01)

(58) Field of Classification Search
CPC .. G06F 3/04815; G06F 3/04847; G06F 3/017; G06F 3/011; G02B 27/0172
See application file for complete search history.

(56) References Cited

U.S. PATENT DOCUMENTS

| | | | |
|---|---|---|---|
| 9,665,988 | B2 | 5/2017 | Djorgovski et al. |
| 9,710,953 | B2 | 7/2017 | Fukazawa et al. |
| 9,761,036 | B2 | 9/2017 | Rzeszotarski et al. |

OTHER PUBLICATIONS

Hadjar, Hayet et al., "WebVR based Interactive Visualization of Open Health Data," WS.2 2018: Proceedings of the 2nd International Conference on Web Studies (Oct. 2018), https://doi.org/10.1145/3240431.3240442, 9 pages.

Nagel, Henrik R. et al., "Methods for Visual Mining of Data in Virtual Reality," In Proceedings of the International Workshop on Visual Data Mining, in conjunction with ECML/PKDD2001, 2nd European Conference on Machine Learning and 5th European Conference on Principles and Practice of Knowledge Discovery in Databases (2001), 15 pages.

Gray, Geoffery E., "Navigating 3d Scatter Plots in Immersive Virtual Reality," Thesis for Master of Design degree, University of Washington (2016), available at https://digital.lib.washington.edu/researchworks/handle/1773/37003, 70 pages.

(Continued)

*Primary Examiner* — Andrey Belousov
(74) *Attorney, Agent, or Firm* — Proskauer Rose LLP

(57) ABSTRACT

Methods and apparatuses are described for generating and manipulating 3D objects in a 3D environment of an alternative reality software application. A server retrieves a data set comprising data elements, each having one or more attributes. The server generates, for each data element, a virtual object, each virtual object positioned inside a virtual container and located in proximity to a center of the virtual container. The server attaches virtual magnets to an exterior surface of the virtual container, each magnet associated with a data filter value and an attraction value. The server determines, for each virtual object, a movement distance and a movement speed in relation to each virtual magnet based upon the data filter value and the attraction value for the virtual magnet. The server moves at least a portion of the virtual objects to a new location based upon the movement distance and movement speed.

29 Claims, 17 Drawing Sheets

(56) References Cited

OTHER PUBLICATIONS

Gustafsson, Mattias and Odd, Oliver, "Virtual Reality Data Visualization: Concepts, technologies and more," Degree thesis in Computer Science and Engineering, Halmstad University, School of Information Technology (2018), available at http://www.diva-portal.org/smash/record.jsf?pid=diva2%3A1222037&dswid=6004, 45 pages.

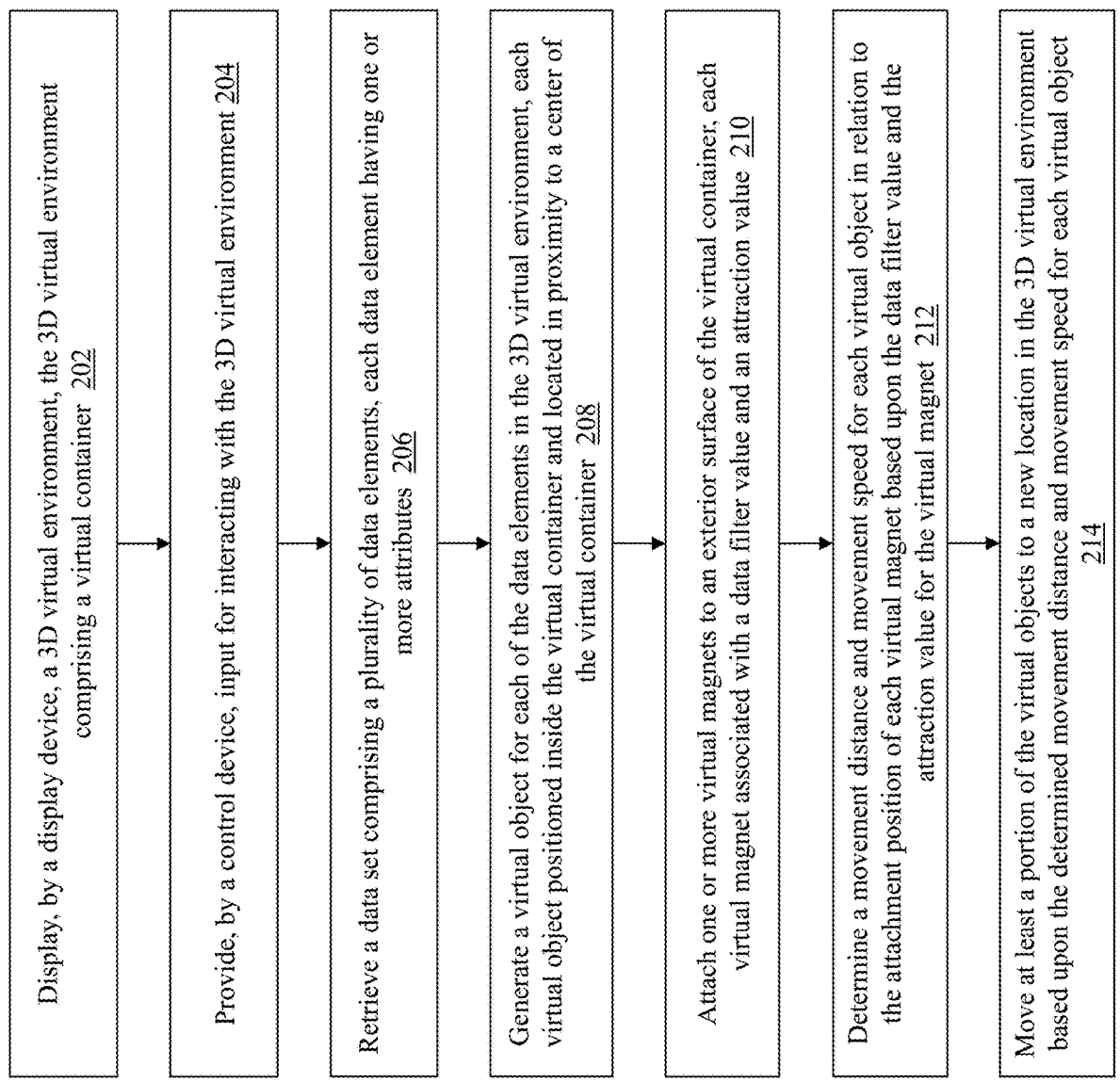

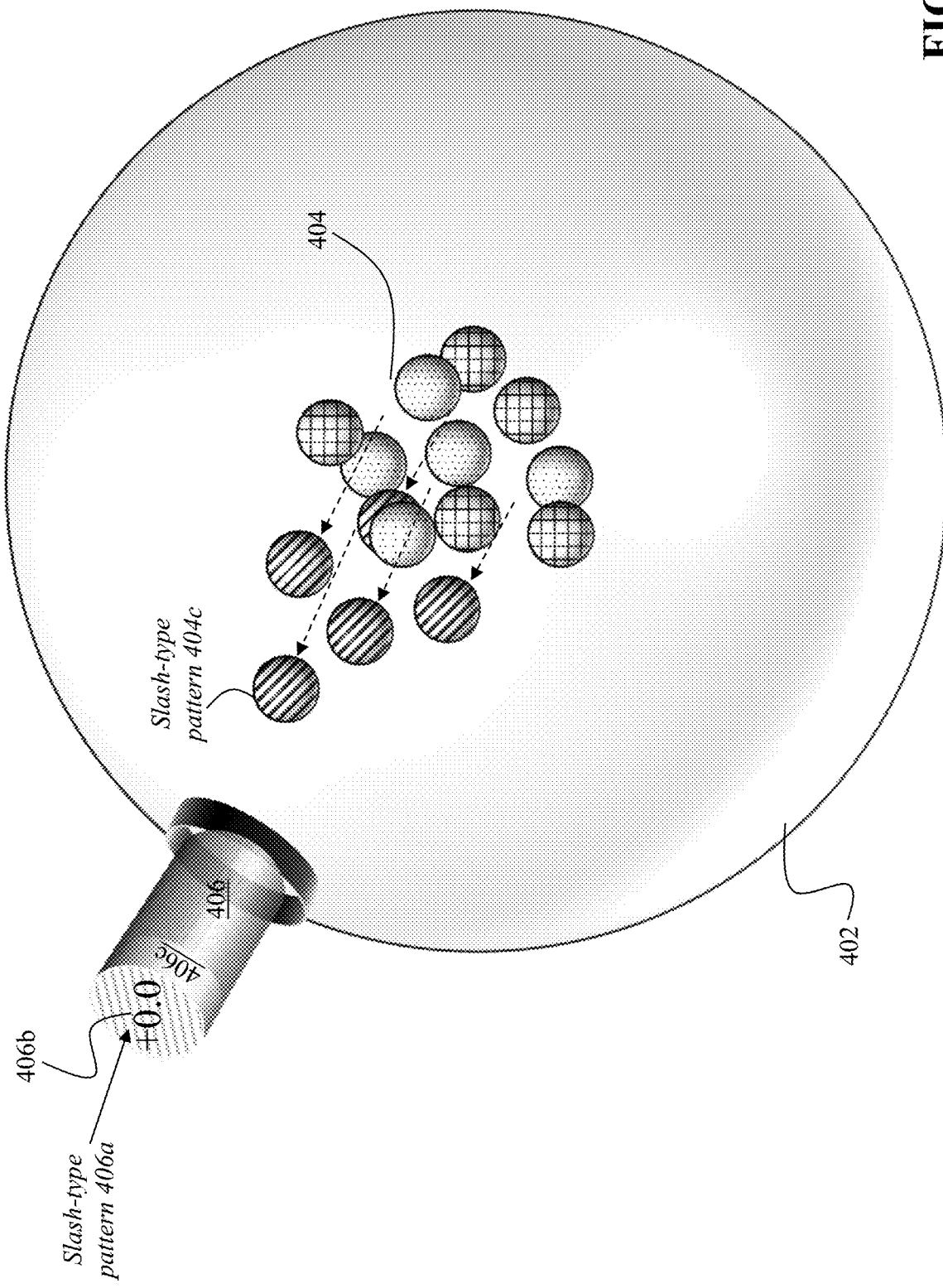

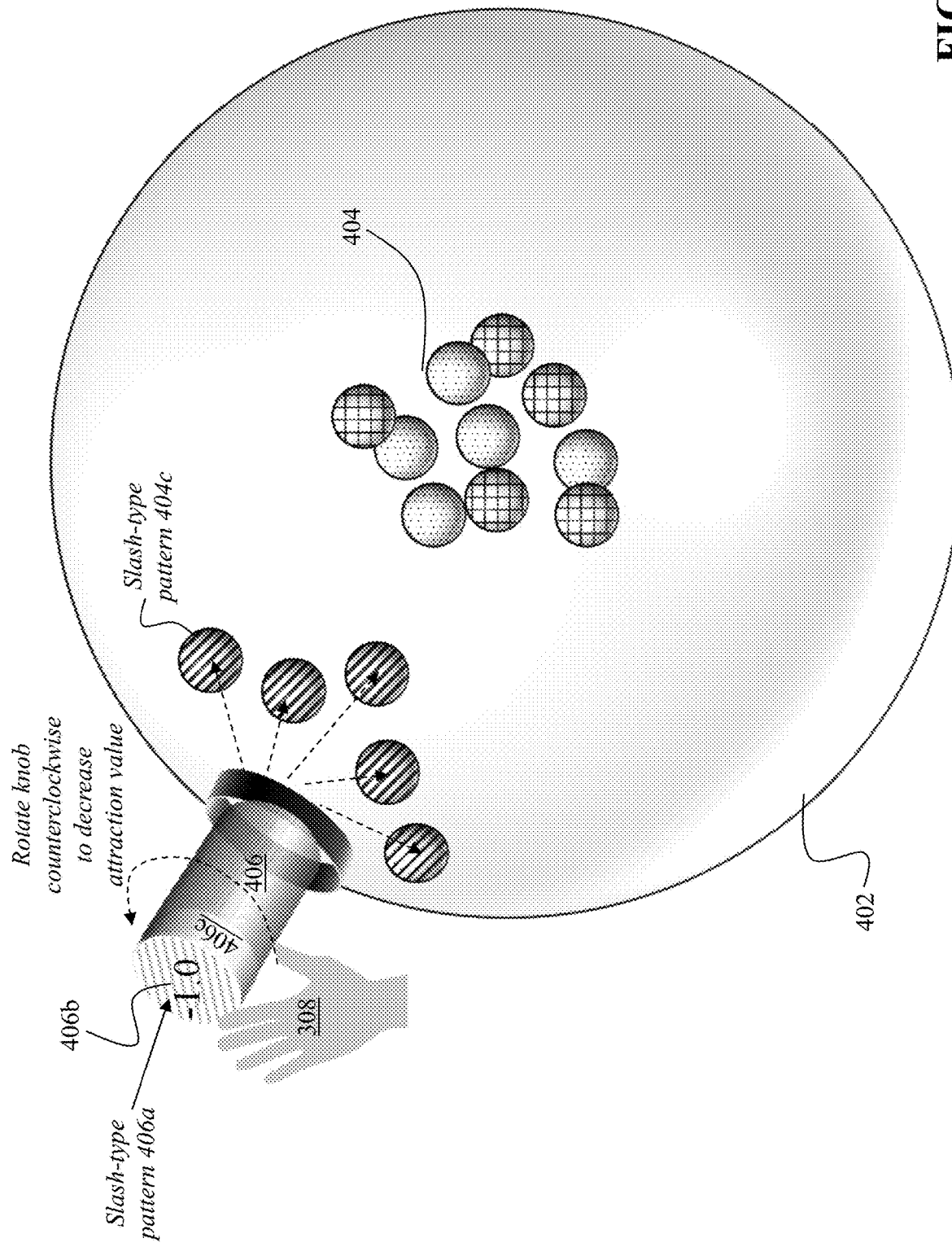

GENERATING AND MANIPULATING THREE-DIMENSIONAL (3D) OBJECTS IN A 3D ENVIRONMENT OF AN ALTERNATIVE REALITY SOFTWARE APPLICATION

TECHNICAL FIELD

This application relates generally to methods and apparatuses, including computer program products, for generating and manipulating three-dimensional (3D) objects in a 3D environment of an alternative reality software application.

BACKGROUND

Generally, alternative reality software applications provide for an experience in which a user's real-world viewing perspective is replaced by or enhanced with a virtual 3D environment. In the context of this application, the term "alternative reality" encompasses all different types of virtual experiences, including but not limited to: virtual reality (VR), augmented reality (AR), mixed reality (MR), extended reality (XR) and others. A user wears a headset or similar apparatus that includes specialized display devices to render the virtual environment to the user, and the headset can include certain components (e.g., gyroscope(s), accelerometer(s), magnetometer(s), etc.) that detect and capture the user's head movements in order to update the virtual environment in response to the movements in a seamless, real-time manner. Exemplary headsets comprise the VIVE™ and VIVE Pro™ available from HTC Corporation, the Oculus Rift™ available from Facebook Technologies, LLC, and the Sony Playstation™ VR headset available from Sony Corporation.

An emerging type of software application being used in alternative reality environments is data exploration, where data repositories can be leveraged to generate 3D objects in the alternative reality environment that correspond to data points within one or more databases. A user of the alternative reality software application can view and manipulate the 3D objects in order to analyze and investigate the underlying data points in an immersive and interactive fashion. However, most alternative reality software applications fail to provide functionality that enables a user to efficiently interact with and explore large volumes of data points, particularly when the data points are closely clustered in the 3D virtual environment. In addition, such alternative reality software application do not allow for manipulation of data points in relation to one or more external data interaction objects that can be placed in the 3D environment in order to move and/or rearrange the 3D objects representing the data points—including control of movement playback over time to see how 3D objects change and move as the data interaction objects are controlled by the user.

SUMMARY

Therefore, what is needed are methods and systems that incorporate the use of one or more data interaction objects placed in the 3D environment by a user of an alternative reality software application, that provide for customized manipulation and arrangement of 3D objects representing data points in a 3D virtual environment. The techniques described herein beneficially enable users to insert specific data interaction objects (e.g., magnets) at strategic locations within the 3D virtual environment, where the data interaction objects correspond to one or more customizable data attributes that are compared to the 3D objects and enable automatic attraction of one or more 3D objects toward the corresponding data interaction object and/or repulsion of one or more 3D objects away from the corresponding data interaction object. Therefore, based upon manipulation of the data interaction objects and their underlying attribute values, the 3D data points move in relation to the data interaction objects and in relation to each other to provide for dynamic user interaction and data visualization—including the ability to seamlessly shape data so as to locate data of interest within a large volume of multi-faceted data points.

The invention, in one aspect, features a system for generating and manipulating three-dimensional (3D) objects in a 3D environment of an alternative reality software application. The system includes a display device for displaying a 3D virtual environment, the 3D virtual environment comprising a virtual container. The system includes a control device for interacting with the 3D virtual environment. The system includes a server computing device coupled to the display device and the control device. The server computing device includes a memory for storing computer executable instructions and a processor that executes the computer executable instructions. The server computing device retrieves, based upon input from the control device, a data set comprising a plurality of data elements, each data element having one or more attributes. The server computing device generates, for each of the data elements, a virtual object in the 3D virtual environment, each virtual object positioned inside the virtual container and located in proximity to a center of the virtual container. The server computing device attaches, based upon input from the control device, one or more virtual magnets to an exterior surface of the virtual container, each virtual magnet associated with a data filter value and an attraction value. The server computing device determines, for each virtual object, a movement distance and a movement speed in relation to the attachment position of each virtual magnet on the exterior surface of the virtual container based upon the data filter value and the attraction value for the virtual magnet. The server computing device moves at least a portion of the virtual objects to a new location in the 3D virtual environment based upon the determined movement distance and movement speed for each virtual object.

The invention, in another aspect, features a computerized method of generating and manipulating three-dimensional (3D) objects in a 3D environment of an alternative reality software application. A display device displays a 3D virtual environment, the 3D virtual environment comprising a virtual container. A control device provides for interaction with the 3D virtual environment. A server computing device retrieves, based upon input from the control device, a data set comprising a plurality of data elements, each data element having one or more attributes. The server computing device generates, for each of the data elements, a virtual object in the 3D virtual environment, each virtual object positioned inside the virtual container and located in proximity to a center of the virtual container. The server computing device attaches, based upon input from the control device, one or more virtual magnets to an exterior surface of the virtual container, each virtual magnet associated with a data filter value and an attraction value. The server computing device determines, for each virtual object, a movement distance and a movement speed in relation to the attachment position of each virtual magnet on the exterior surface of the virtual container based upon the data filter value and the attraction value for the virtual magnet. The server computing device moves at least a portion of the virtual objects to a new location in the 3D virtual environment based upon the determined movement distance and movement speed for each virtual object.

The invention, in another aspect, features a computerized method of generating and manipulating three-dimensional (3D) objects in a 3D environment of an alternative reality software application. A server computing device retrieves, based upon input from a control device, a data set comprising a plurality of data elements, each data element having one or more attributes. The server computing device generates, for each of the data elements, a virtual object in the 3D virtual environment, each virtual object positioned inside the virtual container and located in proximity to a center of the virtual container. The server computing device attaches, based upon input from the control device, one or more virtual magnets to an exterior surface of the virtual container, each virtual magnet associated with a data filter value and an attraction value. The server computing device determines, for each virtual object, a movement distance and a movement speed in relation to the attachment position of each virtual magnet on the exterior surface of the virtual container based upon the data filter value and the attraction value for the virtual magnet. The server computing device moves at least a portion of the virtual objects to a new location in the 3D virtual environment based upon the determined movement distance and movement speed for each virtual object.

Any of the above aspects can include one or more of the following features. In some embodiments, retrieving a data set comprising a plurality of data elements comprises generating one or more virtual database objects in the 3D virtual environment; selecting, based upon input from the control device, one of the virtual database objects; and retrieving the data set comprising the plurality of data elements from a database based upon the selected virtual database object. In some embodiments, the server computing device adjusts, based upon input from the control device, the attraction value for one of the virtual magnets; determines, for each virtual object, a second movement distance and a second movement speed in relation to the attachment position of the adjusted virtual magnet on the exterior surface of the virtual container based upon the data filter value and the attraction value for the virtual magnet; and moves at least a portion of the virtual objects to a second new location in the 3D virtual environment based upon the second movement distance and second movement speed for each virtual object.

In some embodiments, the virtual objects are arranged with each other in the 3D virtual environment based upon a relationship between the one or more attributes of the data element corresponding to each virtual object. In some embodiments, when moving in the 3D virtual environment, the virtual objects maintain their arrangement with each other.

In some embodiments, after at least a portion of the virtual objects have moved to a new location in the 3D virtual environment, the server computing device selects, based upon input from the control device, a portion of the virtual objects; and generates a new 3D virtual environment comprising a new container, the selected virtual objects positioned inside the new virtual container and located in proximity to a center of the new virtual container. In some embodiments, the server computing device saves the data elements of the selected virtual objects in a database as a new data set.

In some embodiments, the server computing device determines, for each virtual object, a change in orientation in relation to the attachment position of each virtual magnet on the exterior surface of the virtual container based upon the data filter value and the attraction value for the virtual magnet; and adjusts an orientation of at least a portion of the virtual objects in the 3D virtual environment based upon the determined change in orientation for each virtual object. In some embodiments, the server computing device detects a change to the one or more attributes of the data elements associated with at least a portion of the virtual objects; determines, for each virtual object, a new movement distance and a new movement speed in relation to the attachment position of each virtual magnet on the exterior surface of the virtual container based upon the data filter value and the attraction value for the virtual magnet; and moves at least a portion of the virtual objects to a new location in the 3D virtual environment based upon the determined new movement distance and new movement speed for each virtual object.

In some embodiments, the one or more virtual magnets are attached to the exterior surface of the virtual container at different positions. In some embodiments, the server computing device attaches, based upon input from the control device, one of the virtual magnets to a new position on the exterior surface of the virtual container; determines, for each virtual object, a new movement distance and a new movement speed in relation to the new attachment position of each virtual magnet on the exterior surface of the virtual container based upon the data filter value and the attraction value for the virtual magnet; and moves at least a portion of the virtual objects to a new location in the 3D virtual environment based upon the determined new movement distance and new movement speed for each virtual object. In some embodiments, the display device is a virtual reality (VR) headset and the control device is a VR controller. In some embodiments, the one or more magnets each comprises a virtual knob that displays the attraction value associated with the magnet. In some embodiments, the server computing device turns the virtual knob based upon input from the control device; and changes the attraction value associated with the magnet based upon the turning of the virtual knobs.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of generating and manipulating 3D objects in a 3D environment of an alternative reality software application.

FIGS. 4A to 4F comprise diagrams that show an exemplary placement of a first virtual magnet on an exterior surface of a virtual container to attract virtual objects within the virtual container and adjustment of an attraction value of the first virtual magnet.

DETAILED DESCRIPTION

Figure 1:
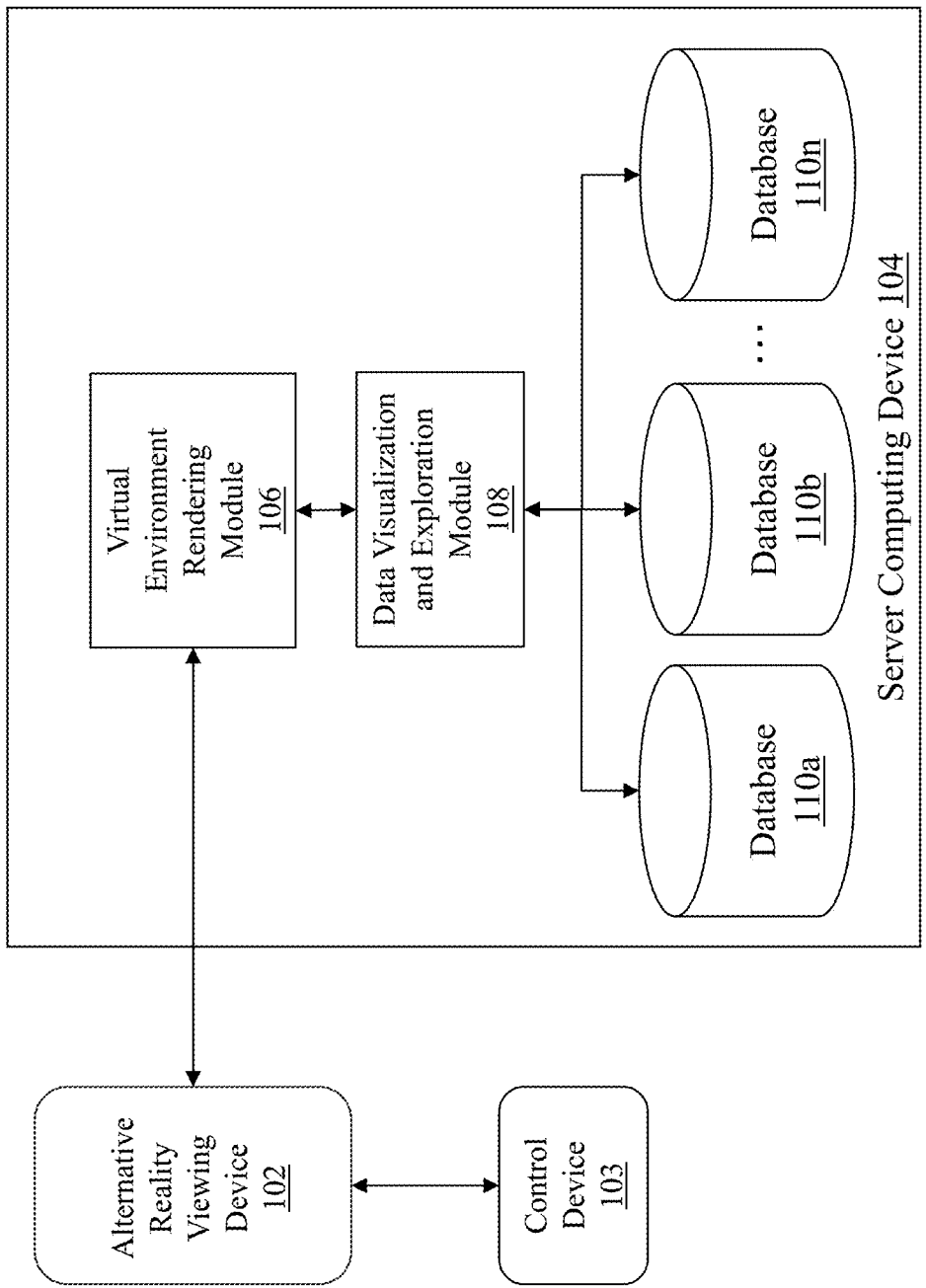
FIG. 1 is a block diagram of a system for generating and manipulating 3D objects in a 3D environment of an alternative reality software application.

FIG. 1 is a block diagram of a system 100 for generating and manipulating 3D objects in a 3D environment of an alternative reality software application. The system 100 includes an alternative reality viewing device 102, a control device 103, and a server computing device 104 that includes a virtual environment rendering module 106, a data visualization and exploration module 108, and a plurality of databases 110a-110n.

The alternative reality viewing device 102 comprises an apparatus (e.g., a headset, goggles, glasses, etc.) that enable a user to view a 3D environment (such as a virtual reality (VR) environment, an augmented reality (AR) environment, a mixed reality (MR) environment, and/or an extended reality (XR) environment). Exemplary alternative reality viewing devices 102 can include, but are not limited to, the VIVE™ and VIVE Pro™ available from HTC Corporation, the Oculus Rift™ available from Facebook Technologies, LLC, and the Sony Playstation™ VR headset available from Sony Corporation. The alternative reality viewing device 102 connects to the server computing device 104 to receive data corresponding to a rendered 3D environment from the server computing device 104 for display on the device 102. In some embodiments, the alternative reality viewing device 102 is coupled to the server computing device 104 via a physical connection (e.g., one or more cables hardwired using proprietary hardware connections to HDMI, USB and/or Display-ports of the server computing device 104). In some embodiments, the alternative reality viewing device 102 is coupled to the server computing device 104 via a wireless connection (e.g., WiFi, Bluetooth™, WiGig™ from Intel Corporation). In some embodiments, a communications network (e.g., LAN, WAN) is located between the alternative reality viewing device 102 and the server computing device 104.

Further, the alternative reality viewing device 102 is coupled to a control device 103 which can comprise one or more devices that enable a user wearing the alternative reality viewing device 102 to interact with the alternative reality environment. For example, the control device 103 can be an apparatus such as a joystick, keypad, haptic controller, glove, and the like that the user holds and manipulates to provide input to the server computing device 104 for interaction with the alternative reality environment—including manipulation of objects within the environment. In this context, the user can provide input in any of a number of different ways, including but not limited to performing gestures with the control device 103, pressing one or more buttons on the control device 103, moving the control device 103 in relation to objects in the alternative reality environment, or any combination of the above. In some embodiments, the user can hold a plurality of control devices 103 (e.g., a joystick in each hand) to provide input to the server computing device 104.

The server computing device 104 is a device including specialized hardware and/or software modules that execute on a processor and interact with memory modules of the computing device 104, to receive data from other components of the system 100, transmit data to other components of the system 100, and perform functions for generating and manipulating 3D objects in a 3D environment of an alternative reality software application as described herein. The server computing device 104 includes a virtual environment rendering module 106, and a data visualization and exploration module 108 that execute on the processor of the computing device 104. In some embodiments, the modules 106, 108 are specialized sets of computer software instructions programmed onto one or more dedicated processors in the server computing device 104 and can include specifically-designated memory locations and/or registers for executing the specialized computer software instructions.

Although the computing modules 106, 108 are shown in FIG. 1 as executing within the same server computing device 104, in some embodiments the functionality of the modules 106, 108 can be distributed among a plurality of computing devices. As shown in FIG. 1, the server computing device 104 enables the modules 106, 108 to communicate with each other, and with database 110, in order to exchange data for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein. Also, in some embodiments, the server computing device 104 can instead be a desktop or laptop computer coupled to the alternative reality viewing device 102 via a physical connection. The exemplary functionality of the modules 106, 108 is described in detail below.

The databases 110a-110n are computing modules embedded in and/or coupled to the server computing device 104 that are configured to receive, generate, store, and provide for retrieval specific segments of data relating to the process of generating and manipulating 3D objects in a 3D environment of an alternative reality software application as described herein. In some embodiments (as shown in FIG. 1), all or a portion of the databases 110a-110n can be integrated with the server computing device 104. In some embodiments, one or more of the databases 110a-110n can be located on a separate computing device or devices, available either local connection or remote connection (e.g., cloud-based services). The databases 110a-110n can comprise one or more databases configured to store portions of data used by the other components of the system 100, as will be described in greater detail below. In some embodiments, the databases 110a-110n functions as a data repository to store computing files in memory and/or on disk. For example, the databases 110a-110n can be remote accessed via a LAN/WAN, or the databases 110a-110n can be internal to the server computing device 104.

FIG. 2 is a flow diagram of a computerized method 200 of generating and manipulating 3D objects in a 3D environment of an alternative reality software application, using the system 100 of FIG. 1. The alternative reality display device 102 displays (202) a 3D virtual environment as generated by the virtual environment rendering module 106 of server computing device 104. For example, the alternative reality display device 102 can establish a communication session with the virtual environment rendering module 106 of server computing device 104, and the module 106 can generate the 3D virtual environment (using, e.g., specialized graphics processing units (GPUs) of server computing device 104) and transmit the generated environment to the display device 102 for display to a user wearing or viewing the display device 102.

Generally, the 3D virtual environment comprises a 3D setting, such as a landscape or room, in which the user is placed. The 3D virtual environment also comprises a virtual container for holding a plurality of 3D objects that can be arranged or distributed throughout the 3D setting such that at least a portion of the 3D objects are visible to the user. As will be explained in greater detail below, in some embodiments the 3D virtual environment can include an area for selecting and loading data elements from one or more databases (e.g., databases 110*a*-110*n*) as 3D objects in the 3D virtual environment and an area that includes the above-referenced virtual container for viewing and manipulating the 3D objects corresponding to the data elements.

Continuing with FIG. 2, the control device 103 provides (204) input for interacting with the 3D virtual environment, including the manipulation of one or more 3D objects in the virtual environment. As mentioned previously, the control device 103 enables a user wearing or viewing the display device 102 to provide input that is received and processed by the server computing device 104 in order to change one or more elements of the 3D virtual environment and/or any 3D objects therein. For example, based upon the input, the server computing device 104 can adjust a view of the 3D environment, add or remove one or more 3D objects in the environment, move, rotate or otherwise manipulate one or more 3D objects in the environment (e.g., allowing a user to pick up and move an object, etc.), and so forth. It should be appreciated that many different types of user input can be captured by the control device 103 and provided to the server computing device 104 for manipulation of the 3D virtual environment.

Upon initializing and rendering the 3D virtual environment, the virtual environment rendering module 106 generates an area of the virtual environment that enables a user to load one or more data elements from databases 110*a*-110*n* for visualization, animation, and manipulation in the virtual environment. In some embodiments, the virtual environment rendering module 106 can generate one or more 3D objects that represent the one or more databases 110*a*-110*n* (and/or one or more data elements that are stored within the databases) and provide a mechanism for the user to choose which data element(s) will be loaded for visualization in the virtual environment. Upon selection by the user, the data visualization and exploration module 108 retrieves (206) a data set comprising a plurality of data elements, each data element having one or more attributes, from database(s) 110*a*-110*n*.

Figure 3A:
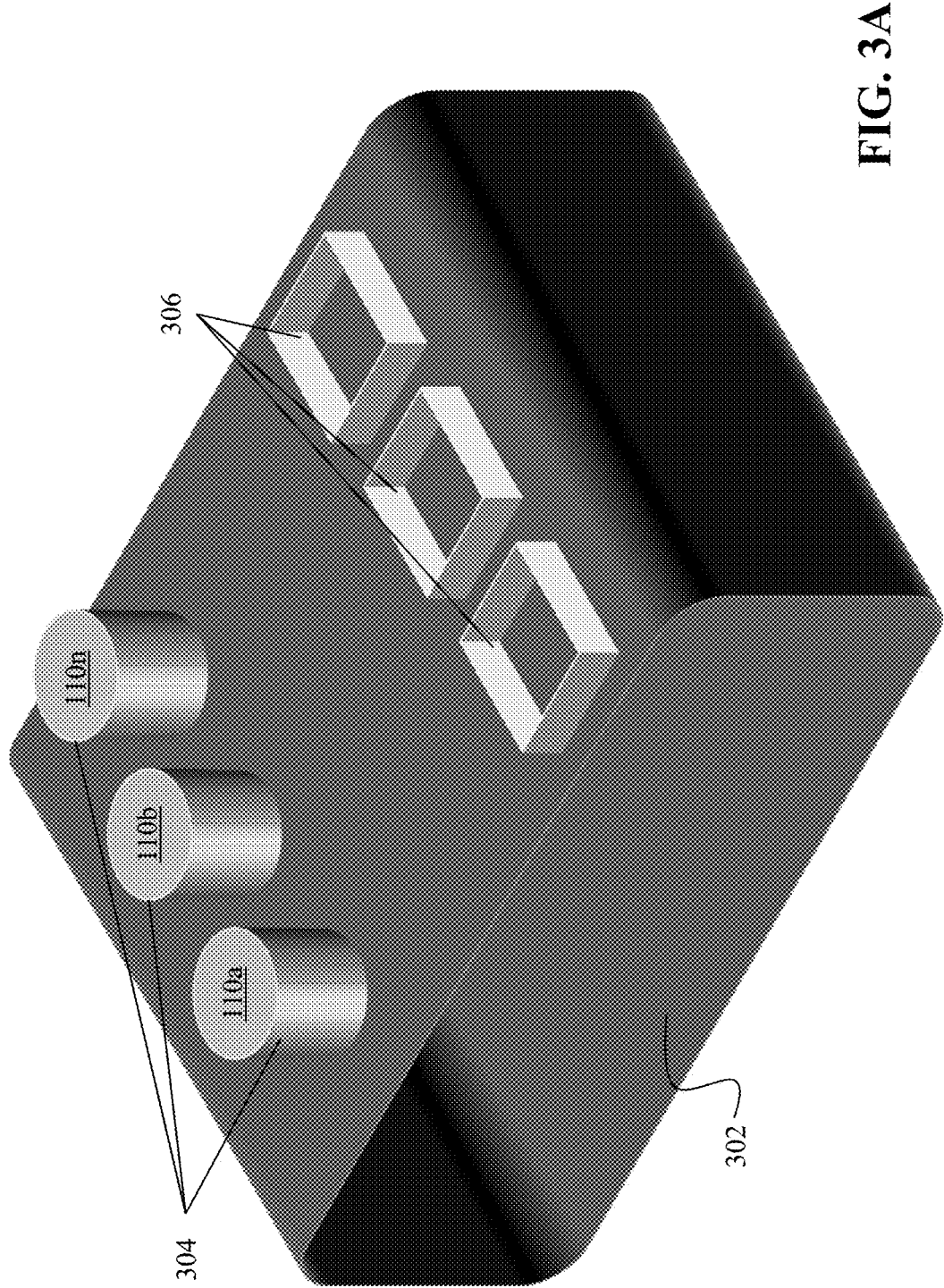
FIGS. 3A to 3D comprise diagrams that show an exemplary selection and loading of data elements from a database in a 3D environment of an alternative reality software application.
Figure 3B:
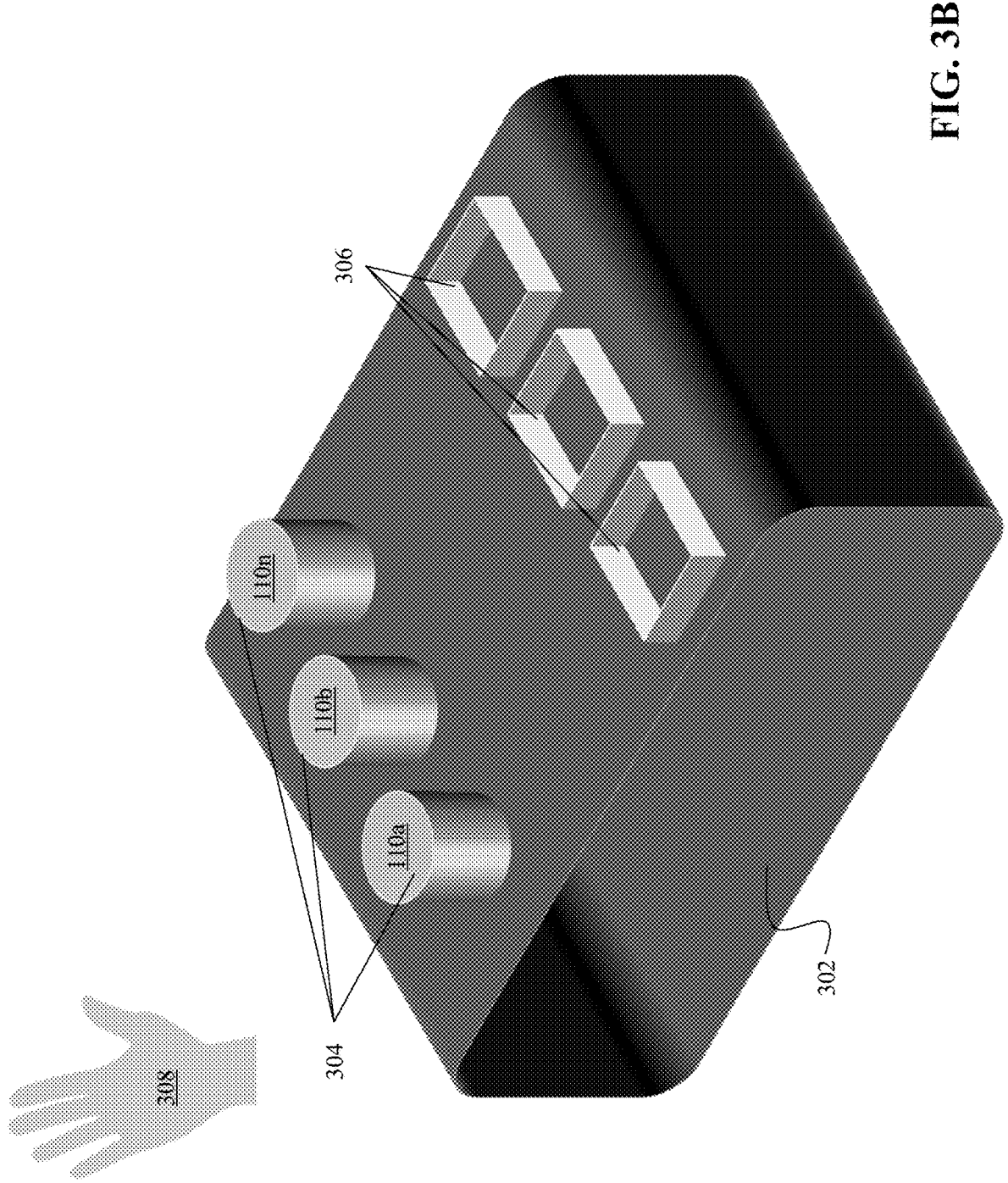

FIGS. 3A to 3D comprise diagrams that show an exemplary selection and loading of data elements from a database in a 3D environment of an alternative reality software application, using the system 100 of FIG. 1. Starting with FIG. 3A, the virtual environment rendering module 106 generates a plurality of 3D objects that will enable the user to select and load data elements as 3D objects in the virtual environment. As shown in FIG. 3A, the objects include a table 302, a plurality of cylinder objects 304 that represent one of the databases 110*a*-110*n*, and a plurality of socket objects 306 that provide for loading of the data elements contained in one or more of the databases 110*a*-110*n*. Turning to FIG. 3B, in order to load data elements for visualization and manipulation, one or more of the cylinder objects 304 must be placed in the socket objects 306. In this way, the user can select particular data elements and/or databases that they want to view in the virtual environment.

Figure 3C:
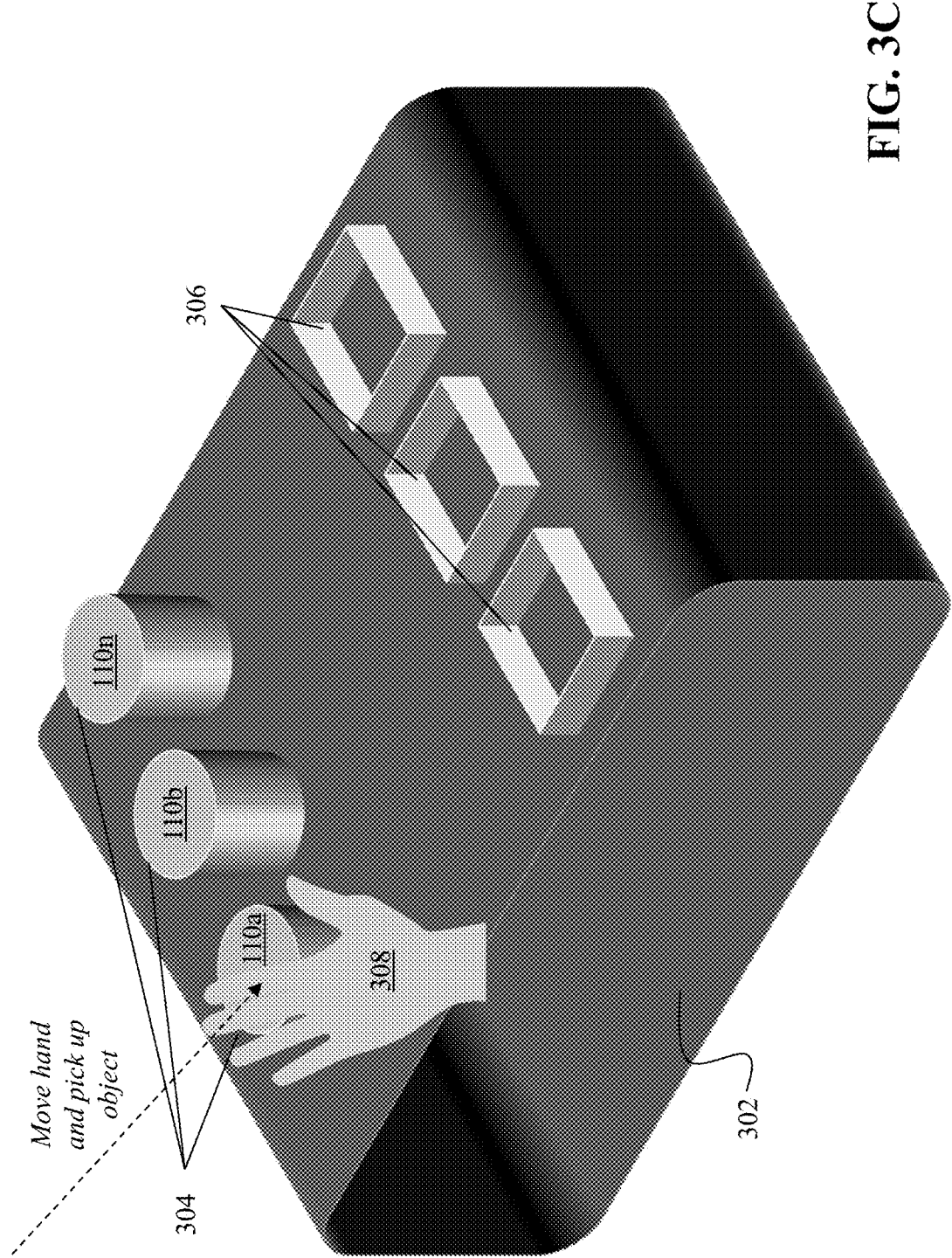
Figure 3D:
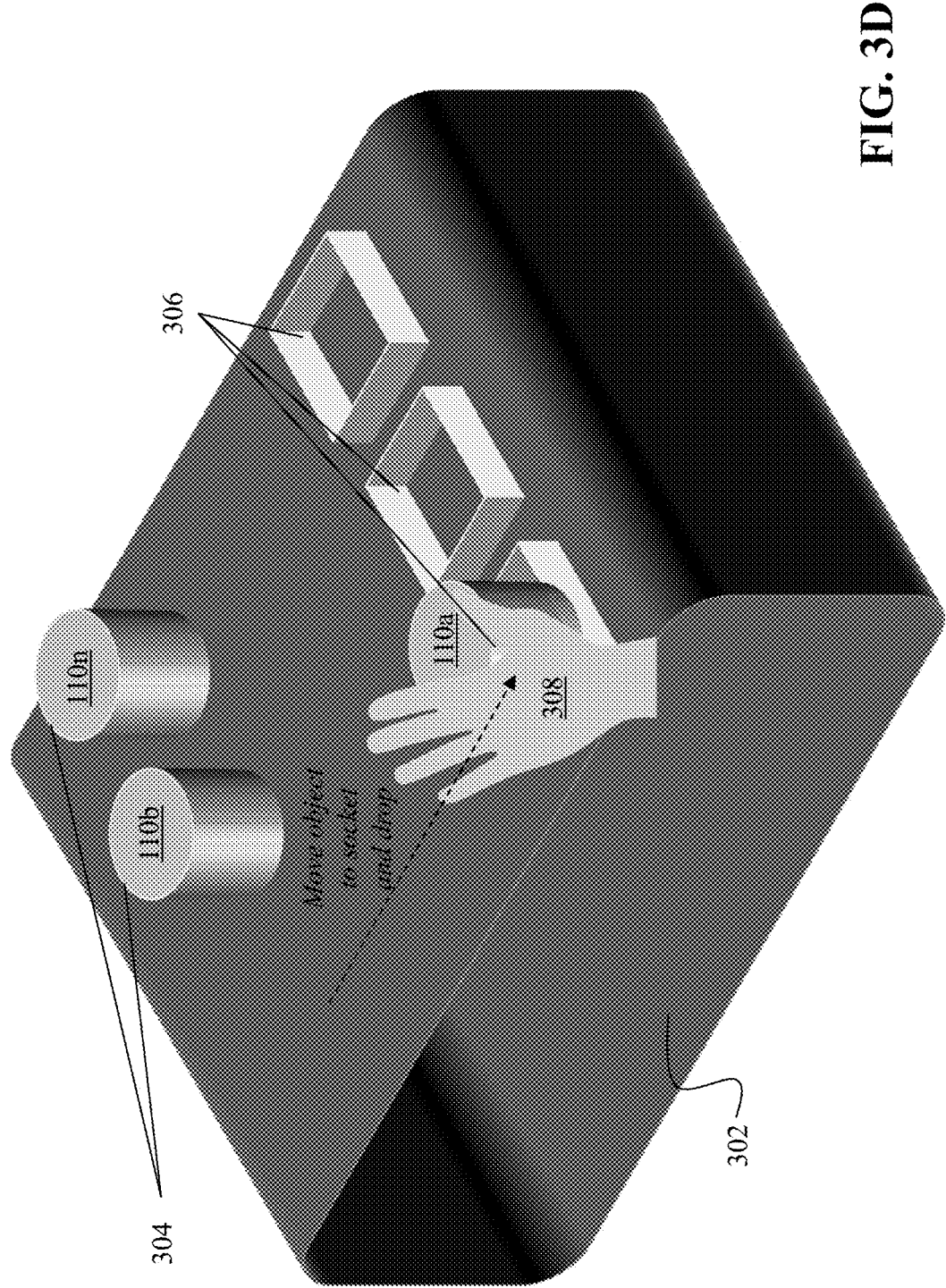

The virtual environment rendering module 106 can generate a virtual object 308 (i.e., a hand) that is responsive to input provided by the user via the control device 103 for interacting with the 3D objects 304 and 306. For example, as shown in FIG. 3C, the user can provide input to the control device 103 to guide the virtual hand 308 in proximity to the object for database 110*a* and, e.g., press a button on the control device 102 to instruct the virtual environment rendering module 106 to pick up the database 110*a* object. Then, turning to FIG. 3D, the user can provide further input to the control device 103 to guide the virtual hand 308 with database 110*a* object to move over one of the socket objects 306 and place the database 110*a* object into the socket—thereby causing the data visualization and exploration module 108 to retrieve the data from database 110*a* and instructing the virtual environment rendering module 106 to generate one or more 3D objects that represent at least a portion of the data elements retrieved from database 110*a* for visualization in the virtual environment—as will be explained in greater detail below with reference to FIGS. 4A-4F and FIGS. 5A-5E.

Also, when the user has finished his exploration of the data elements, the user can provide input to the control device 103 to guide the virtual hand 308 to pick up the database 110*a* object, remove the object from the virtual socket object and return the object to its initial location. It should be appreciated that, in some embodiments, the data elements can change based upon the user's exploration and manipulation of the 3D objects that represent the data elements. In such cases, the data visualization and exploration module 108 can update the underlying data elements in database 110*a* based upon the changes that were made, when the user removes the database 110*a* object from the virtual socket object. It should further be appreciated that a user can select and load multiple databases and/or data sets for exploration.

As mentioned above, once the data elements have been selected and loaded, the virtual environment rendering module 106 generates (208) a virtual object for each of the data elements in the 3D virtual environment. In some embodiments, each data element has one or more attributes or fields that each contains a data type or data value which can serve to differentiate the data element from other data elements. Using the example of stock data, each data element can correspond to a particular stock and/or company (e.g., a NYSE or NASDAQ listed company) and the data elements can be categorized based upon their respective attributes into one of a plurality of different types—for example, the virtual environment rendering module 106 can determine that based upon one or more of the attributes, each data element can be classified as large cap, mid cap, or small cap and the module 106 can represent the 3D objects for each of these classifications in a different color or visual pattern.

Figure 4A:
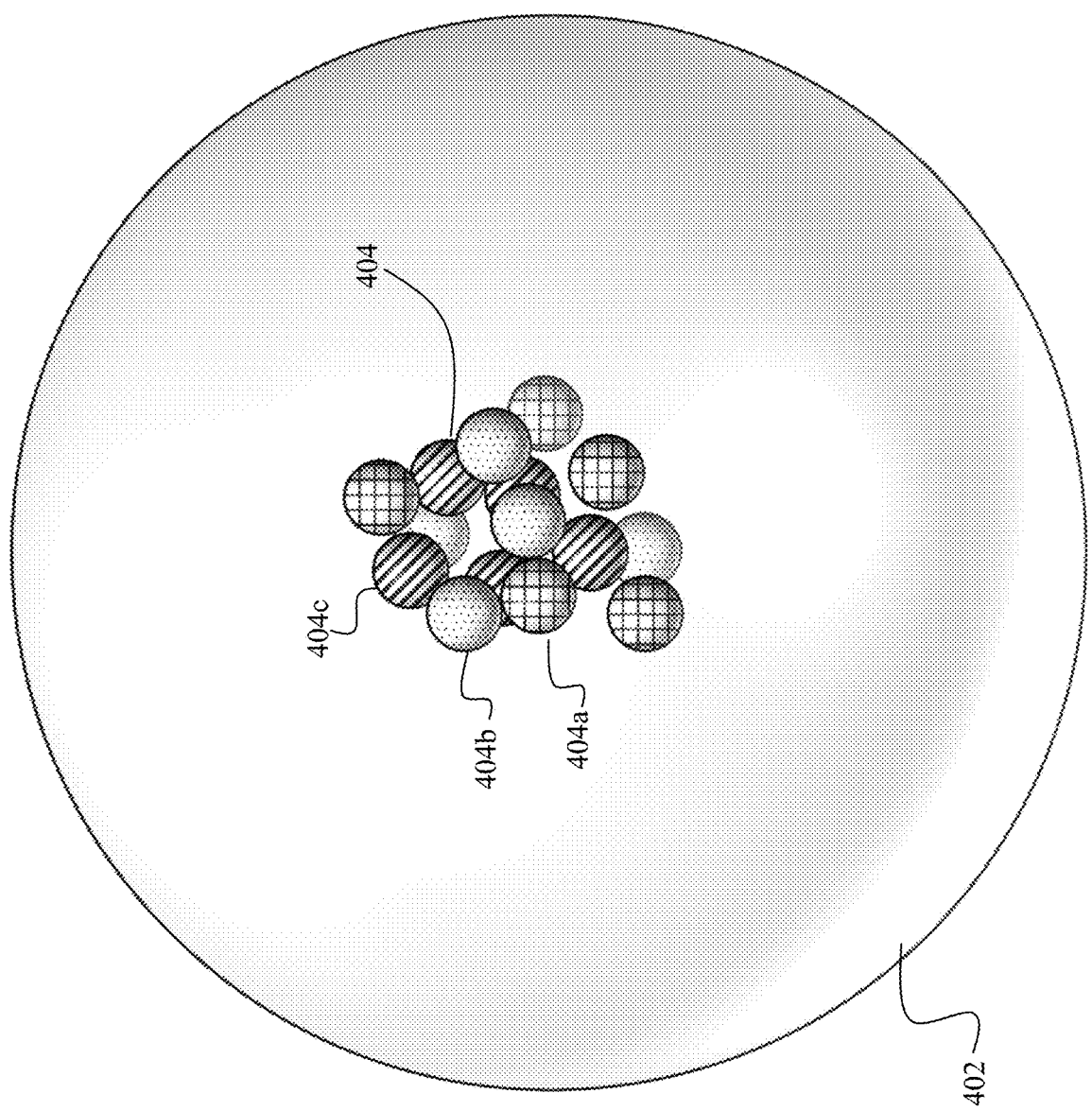

Also, as mentioned previously, the virtual environment rendering module 106 generates a virtual container to hold the 3D virtual objects corresponding to the data elements, where the virtual objects are positioned inside the virtual container and initially located in proximity to a center of the virtual container. The virtual container enables a user to easily view and manipulate the 3D objects in a virtual environment as will be described herein. FIG. 4A is a diagram of an exemplary virtual container 402 (i.e., a transparent or translucent sphere) inside of which are the 3D objects 404 (i.e., smaller spheres) that represent the data elements loaded from database 110*a* in FIGS. 3A to 3D. It should be appreciated that the use of spheres as shapes is merely exemplary and that the virtual container and virtual objects can take any of a variety of different forms without departing from the scope of invention described herein.

As shown in FIG. 4A, the 3D objects 404 are positioned near the center of the container 402 and comprise objects with three different patterns: a grid-type pattern 404a, a dot-type pattern 404b, and a slash-type pattern 404c. As described above, the different patterns can denote data elements with different attributes. It should be appreciated that, in some embodiments, the virtual environment rendering module 106 does not apply different colors or patterns to 3D objects of different data classifications when the 3D objects are initially loaded and rendered—instead, rendering the 3D objects with the same color or pattern prior to exploration.

Figure 4B:
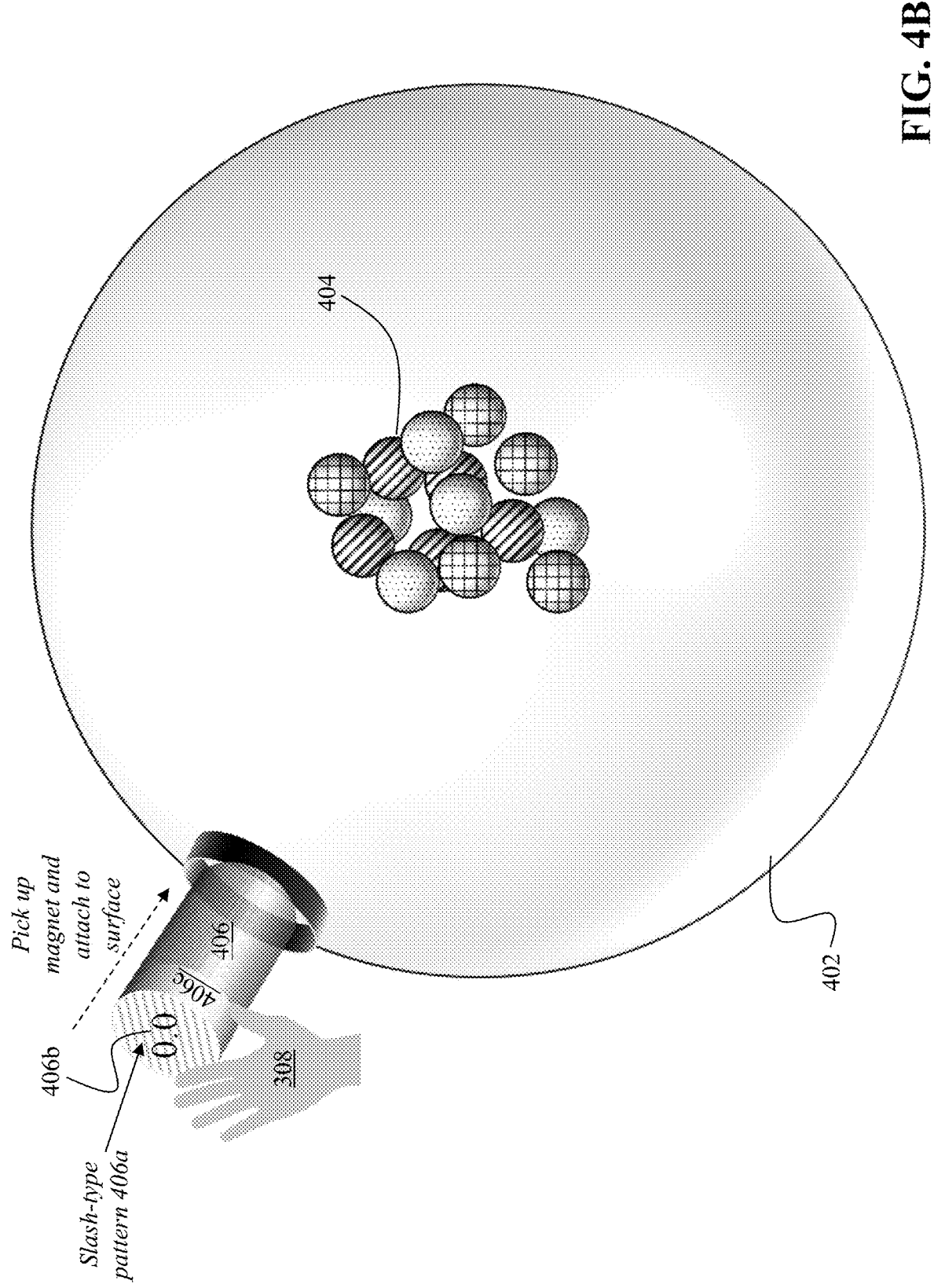

Once the 3D objects are rendered as shown in FIG. 4A, the virtual environment rendering module 106 and the data visualization and exploration module 108 can enable the user wearing or viewing the alternative reality viewing device 102 to explore and manipulate the 3D objects 404 in the virtual container 402 in an advantageous manner. FIGS. 4A to 4F comprise diagrams that show an exemplary placement of a first virtual magnet 406 on an exterior surface of the virtual container 402 to attract virtual objects 404 within the virtual container and adjustment of the attraction value of the first virtual magnet 406, using the system 100 of FIG. 1. As shown in FIG. 4B, the virtual environment rendering module 106 can provide another virtual object (i.e., a virtual magnet 406) for the user to guide the virtual hand 308 to pick up the magnet 406 and attach the magnet (step 210 of FIG. 2) to an exterior surface of the virtual container 402.

The virtual magnet 406 can be associated with a data filter value that enables the user to attract 3D objects 404 based upon the data filter toward the magnet's location and/or repel 3D objects 404 away from the magnet's location (e.g., by comparing the data filter value of the virtual magnet 406 with one or more attributes of the data elements represented by the 3D objects). As shown in FIG. 4B, the virtual magnet 406 comprises a data filter value 406a of large cap stocks (represented by the slash-type pattern on the top of the magnet). Therefore, 3D objects 404c that match the filter (e.g., where the slash-type pattern on the objects 404c and the magnet 406 is the same) move toward the magnet and cluster near the magnet's position.

The virtual magnet 406 also includes an attraction value 406b, which relates to the relative position of similar 3D objects to each other. As shown in FIG. 4B, the attraction value of the magnet 406 is 0.0. In this example, a positive number for the attraction value 406b means that 3D objects whose data attributes match or are similar to the data filter value 40ba are attracted closer to each other (i.e., move closer together than initially positioned in the container 402), a negative number for the attraction value 406b means that 3D objects whose data attributes match or are similar to the data filter value 406a move further apart from each other than initially positioned in the container 402, while zero indicates that 3D objects maintain their initial positional relationship to each other. For example, an attraction value of +1.0 means that the matching 3D objects are clustered in a tight sphere while an attraction value of −1.0 means that the matching 3D objects are clustered in a loose spheroid. As set forth herein, the attraction value 406b can be set from −1.0 to +1.0—although other ranges or types of attraction parameters can be used without departing from the scope of invention described herein.

As shown in FIG. 4B, the virtual magnet 406 includes a knob 406c that can be manipulated by the user (e.g., by using the virtual hand 308 to grasp the knob 406c and rotate the knob 406c clockwise or counterclockwise) to adjust the corresponding attraction value 406b for the magnet 406. It should be appreciated that use of a knob is merely exemplary and that other types of objects and/or mechanisms to allow for adjustment of the attraction value can be envisioned without departing from the scope of invention described herein. Further description on use of the knob 406c is provided below.

Once the magnet 406 is attached to the surface of the virtual container 402, the data visualization and exploration module 108 determines (step 212 of FIG. 2) a movement distance and movement speed for each virtual object 404 in relation to the attachment position of each virtual magnet 406 based upon the data filter value 406a and the attraction value 406b for the magnet 406. The data visualization and exploration module 108 first compares the data filter value 406b of the magnet 406 with the values of one or more attributes of the 3D objects 404 to identify one or more of the objects that match the filter (i.e., objects 404c). In the example shown in FIG. 3C, the magnet 406 has a data filter value 406a indicated by the slash-type pattern on the top of the magnet. Therefore, the 3D objects that also have that slash-type pattern 404c (because they have one or more data attributes that match the filter) are attracted to the magnet 406 and move toward the magnet's location on the surface of the container 402. To accomplish this movement, in some embodiments the module 108 can calculates a movement direction and movement speed for the matching objects 404c, that results in the objects moving toward the magnet 406.

In one embodiment, given the virtual container's 402 center position (ps), the virtual container's radius (rs), the contact point of the virtual magnet 406 and the virtual container 402 (pc), the attraction value (a), the original position of the 3D object (po), the visualization and exploration module 108 can calculate the final position of the 3D object (pf) as follows:

1) Because the virtual magnet 406 will cluster the 3D objects to a spheroid, the module 108 first calculates the polar radius of the spheroid (c):

$$c=rs*(1-a)/2$$

2) Then, the module 108 calculates the z-axis direction of the spheroid (zs):

$$zs = \text{the normalized vector of } (pc-ps)$$

3) The module 108 calculates the center position of the spheroid (cs):

$$cs=pc-zs*c$$

4) The module 108 then calculates the rotation quaternion (rq):

$$rq = \text{the quaternion of the rotation from } (0,0,-1) \text{ to } zs$$

5) The module 108 calculates the final position of the 3D object (pf):

$$pf=rq*((\text{the } x \text{ of } po)*rs/4, (\text{the } y \text{ of } po)*rs/4, (\text{the } z \text{ of } po)*c))$$

Next, given the original position (po) and the final position (pf) of the 3D object, the module 108 determines a movement speed for the 3D object. In one embodiment, the module 108 has the 3D object complete the movement along a straight line from po to pf in one second. The module 108 uses the time elapse (t) (0<t<1) as the interpolant to determine the temporary position (p) along the line between po and pf, as follows:

$$p=po+(pf-po)*t$$

The virtual environment rendering module 106 uses the movement direction and movement speed to animate the matching 3D objects 404c to move (step 214 of FIG. 2) to a new location in the 3D virtual environment based upon the determined movement distance and movement speed for each virtual object 404c.

Figure 4D:
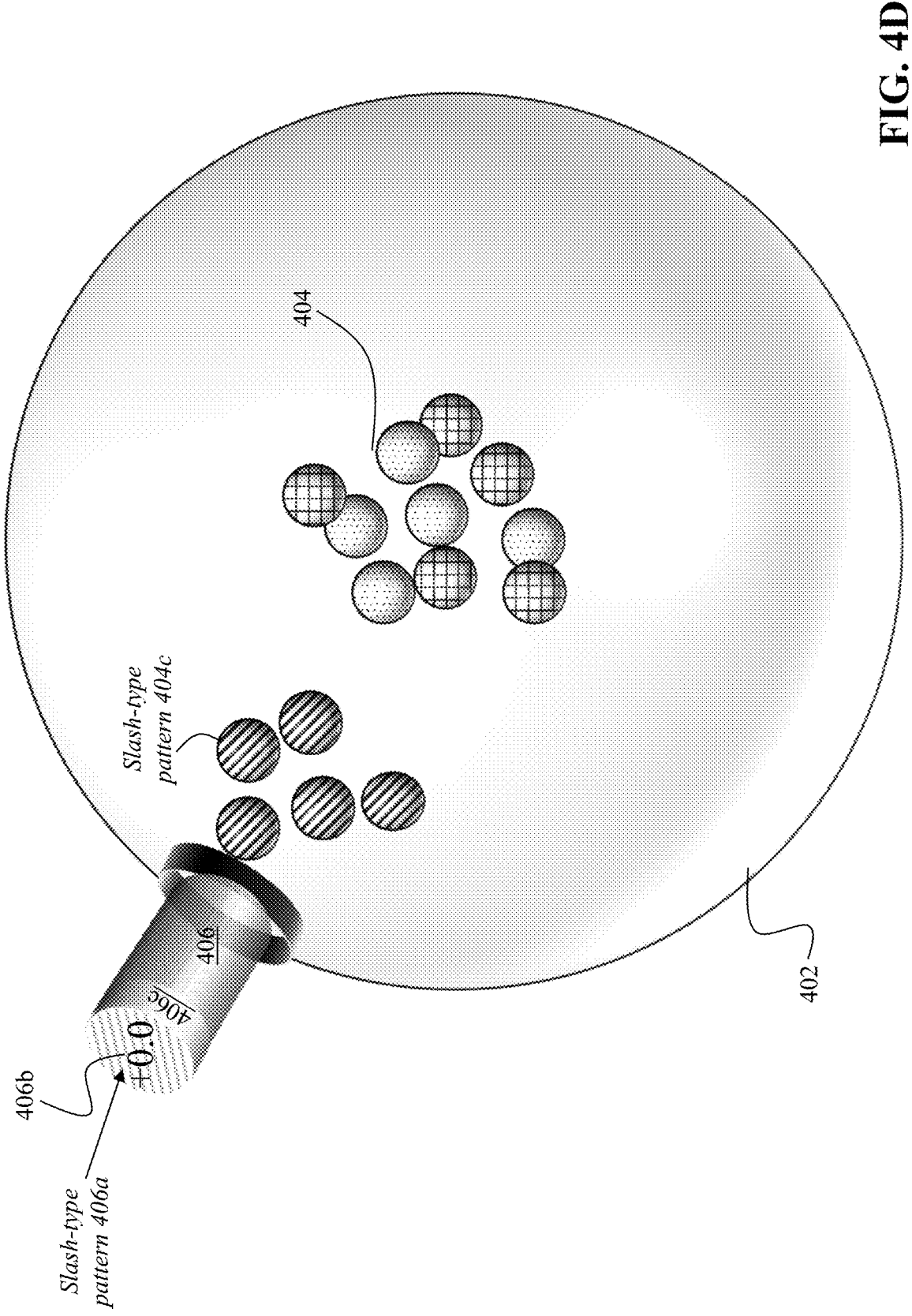

Because the attraction value 406b in FIG. 4C is set to 0.0, the 3D objects 404c maintain their positional relationship with each other as they move toward the magnet 406 (i.e., they do not get closer together or farther apart than they were initially). As shown in FIG. 4D, the objects 404c have completed moving toward the magnet 406 and are clustered near the magnet's location on the container. As can be appreciated, the 3D objects have separated from the remaining 3D objects 404 still positioned at the center of the container 402—thereby enabling the user to easily distinguish between 3D objects of different types and explore multi-faceted data sets quickly and efficiently.

In addition, it should be appreciated that once the matching 3D objects have clustered near the magnet 406, the data visualization and exploration module 108 can extract these 3D objects and the associated data elements to place them in a new container for further exploration and manipulation. For example, all of the 3D objects that have the slash-type pattern 404c may represent companies with a market capitalization of over $10 billion (i.e., large cap). The user can attach the magnet 406 to the container 402 in order to identify those 3D objects, and then extract the 3D objects into a new container—where they are all placed at the center of the new container. Then, the user can repeat the above process with the large cap objects—e.g., filtering the objects using any of a number of other criteria and/or attributes (e.g., stock price, industry/sector, one-day trading volume, etc.) in order to gain further insights into the underlying data elements.

Figure 4E:
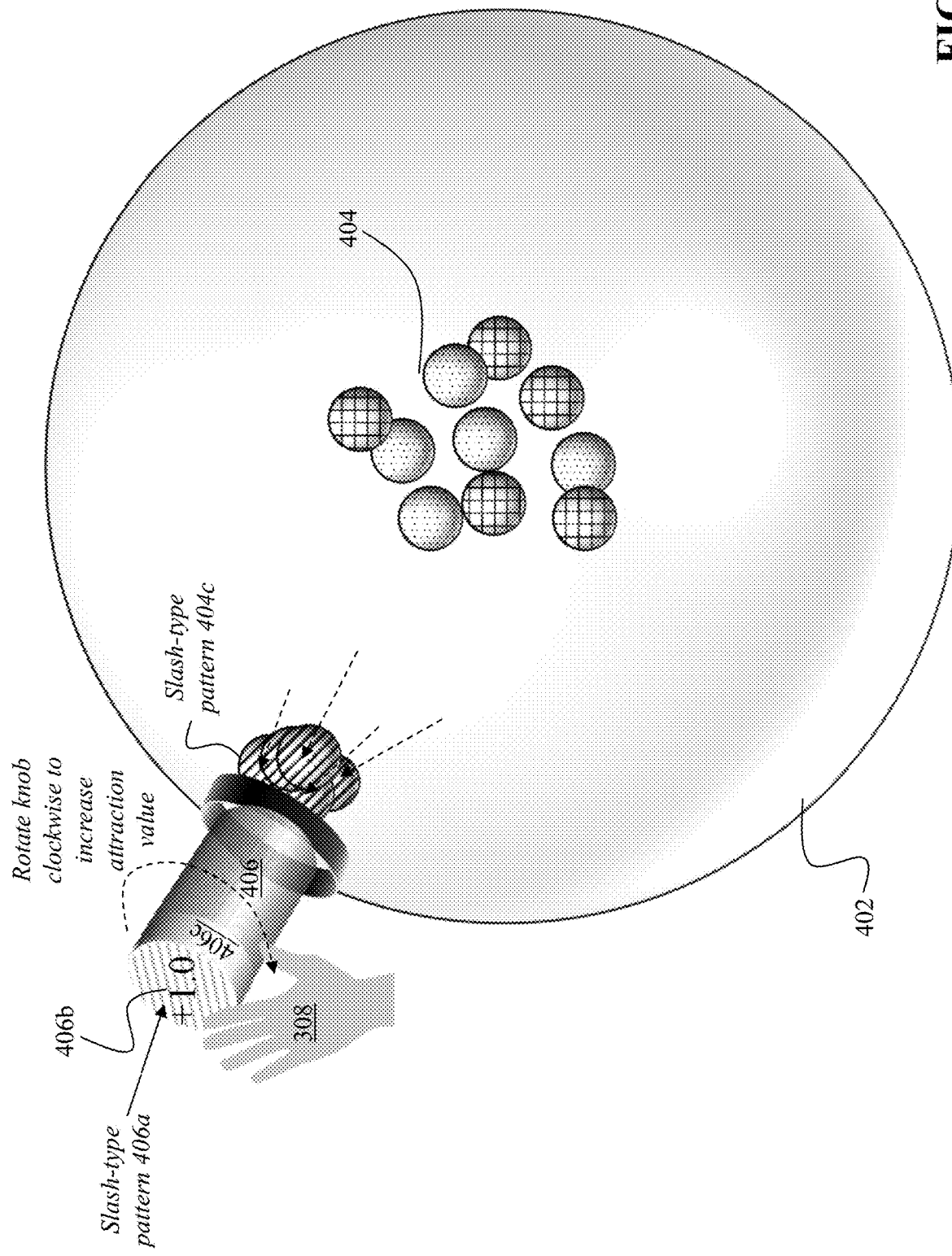

As mentioned above, the magnet 406 includes a knob 406c that can be adjusted by the user to change the attraction value 406b, which in turn re-positions the corresponding 3D objects in the container 402. As shown in FIG. 4E, the user rotates the knob 406c clockwise to increase the attraction value 406a from 0.0 to +1.0—thereby tightly clustering the virtual objects 404c that comprise data attributes that are similar to the data filter value 406a of the magnet (e.g., the slash-type pattern of the magnet matches the slash-type pattern of certain 3D objects 404c) close to each other in a tight sphere near the magnet's position on the container 402.

As shown in FIG. 4F, the user subsequently rotates the knob 406c counterclockwise to decrease the attraction value 406a from +1.0 to −1.0—thereby forcing the virtual objects 404c that comprise data attributes that are similar to the data filter value 406a of the magnet (e.g., the slash-type pattern of the magnet matches the slash-type pattern of certain 3D objects 404c) out of the tight sphere near the magnet's position on the container 402 into a loose spheroid. While the 3D objects 404c spread apart from each other, they are still clustered near the magnet's position and appear separate from the other objects 404.

In order to seamlessly synchronize the adjustment of the attraction value displayed on the knob 406c to the movement of the virtual hand 308 as the user rotates the control device 103, the data visualization and exploration module 108 calculates a new attraction value 406b based upon input from the control device, as follows:

Suppose the rotation quaternion of the magnet 406 is rm, the rotation quaternion of the control device 103 is rc1, and the attraction value 406b is a1 at the time the user starts to turn the knob 406c. The first step is to get the control device's rotation Euler angle to the y-axis of the magnet, ry1. The module 108 obtains the control device's local rotation relative to the magnet knob's rotation, lr1:

$$lr1 = (\text{the inverse of } rc1) * rm$$

$$ry1 = lr1\text{'s } y\text{-axis Euler angle}$$

After the user rotates the control device 103, the module 108 gets a new rotation quaternion rc2. The module 108 can calculate the new Euler angle to the y-axis of the magnet 406 (ry2) using the above method:

$$ry2 = \text{the } y\text{-axis Euler angle of } ((\text{the inverse of } rc2) * rm)$$

Then, the module 108 gets the angle by subtracting the initial value from it:

$$ryDiff = ry2 - ry1$$

Generally, the module 108 should determine the angle to be within a range of [−90°, 90°], where −90° represents an attraction of 0.1, and 90° represents an attraction of 0.9. So, 0° represents an attraction of 0.5. The module 108 calculates the new attraction value a2 as:

$$a2 = a1 + \frac{(0.9 - 0.5)}{90} * ry2$$

Using the new attraction value a2, the module 108 can update the display of the attraction value 406b on the magnet 406.

Figure 5A:
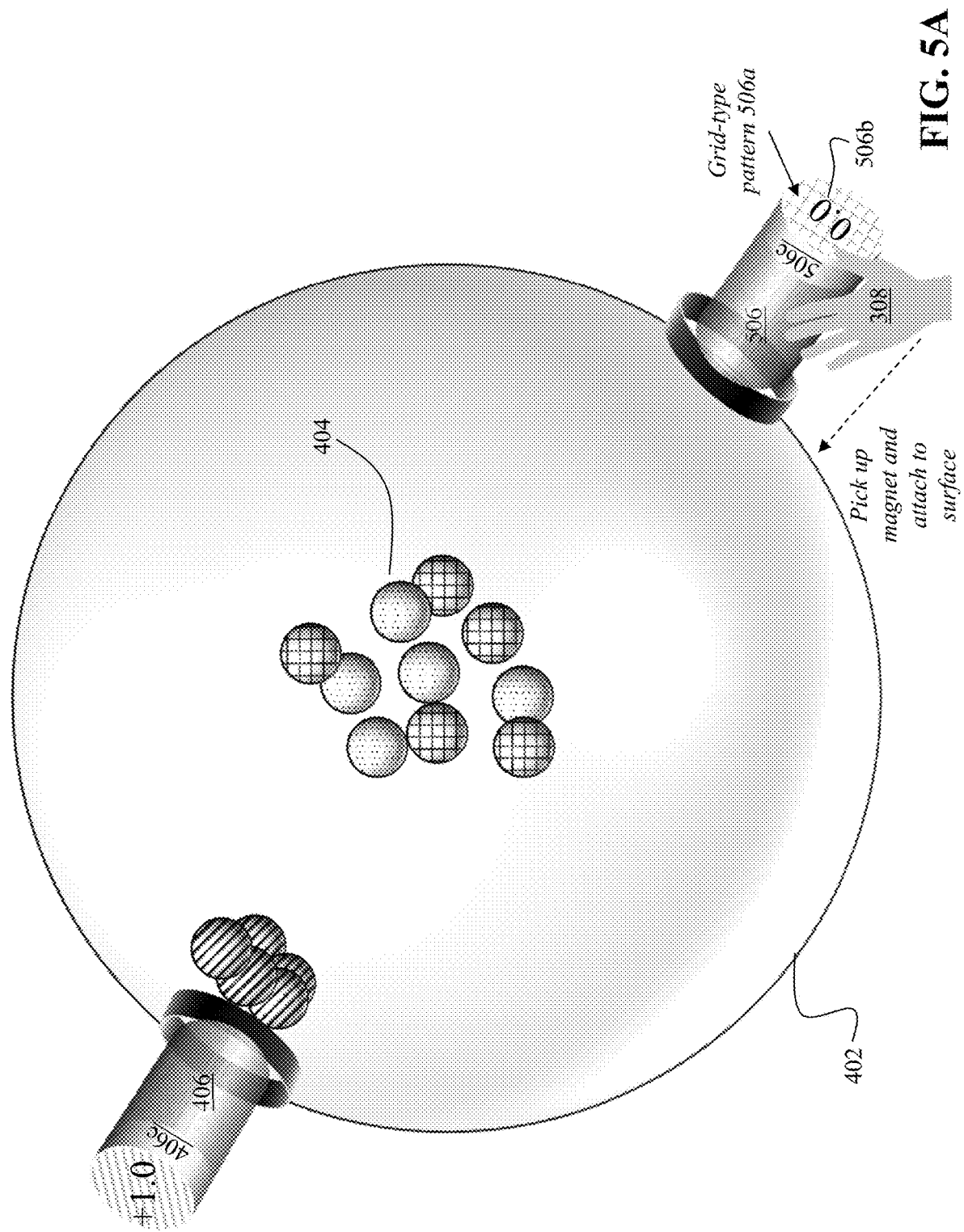
FIGS. 5A to 5E comprise diagrams that show an exemplary placement of a second virtual magnet on an exterior surface of a virtual container to attract virtual objects within the virtual container and adjustment of the attraction value of the second virtual magnet.
Figure 5B:
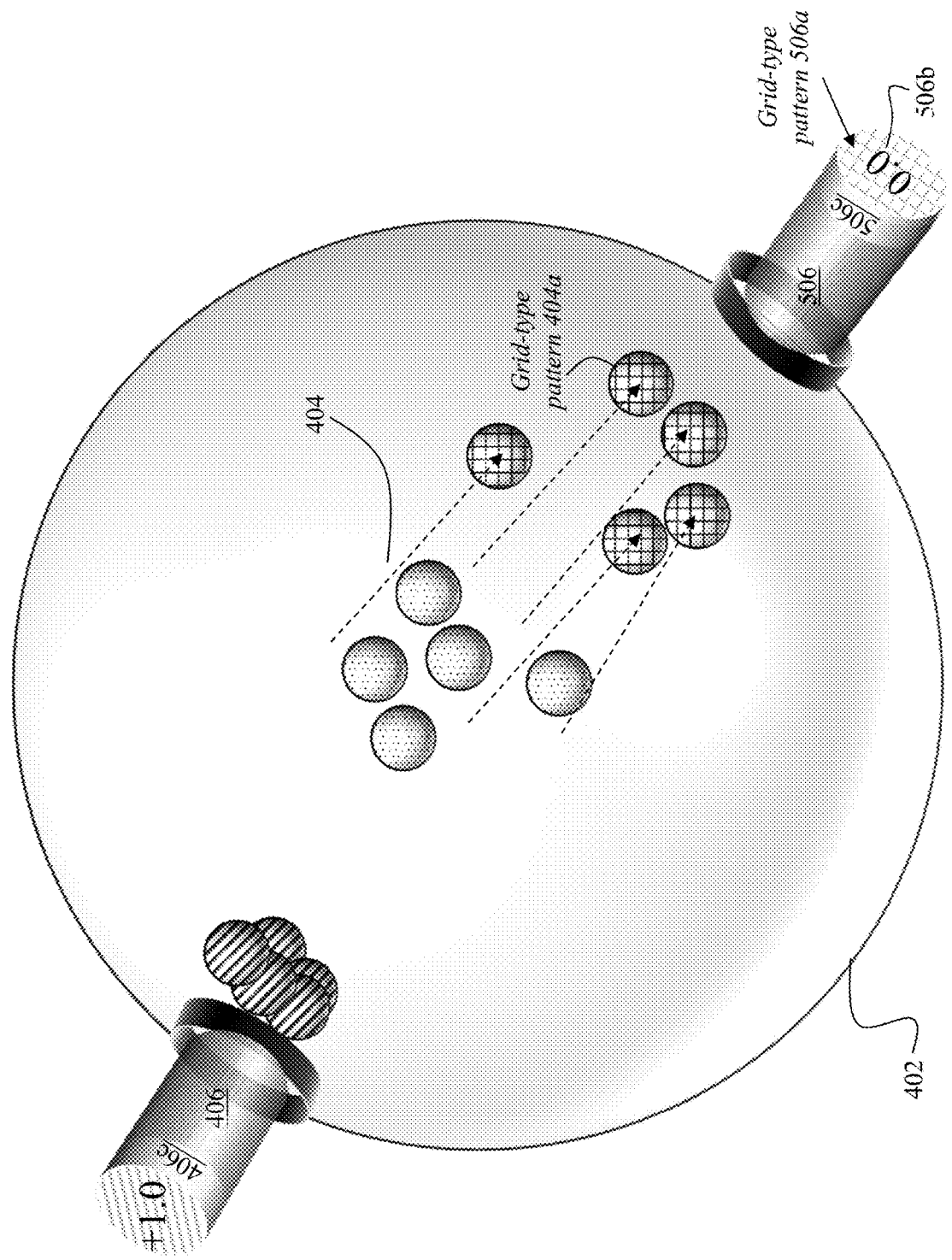
Figure 5C:
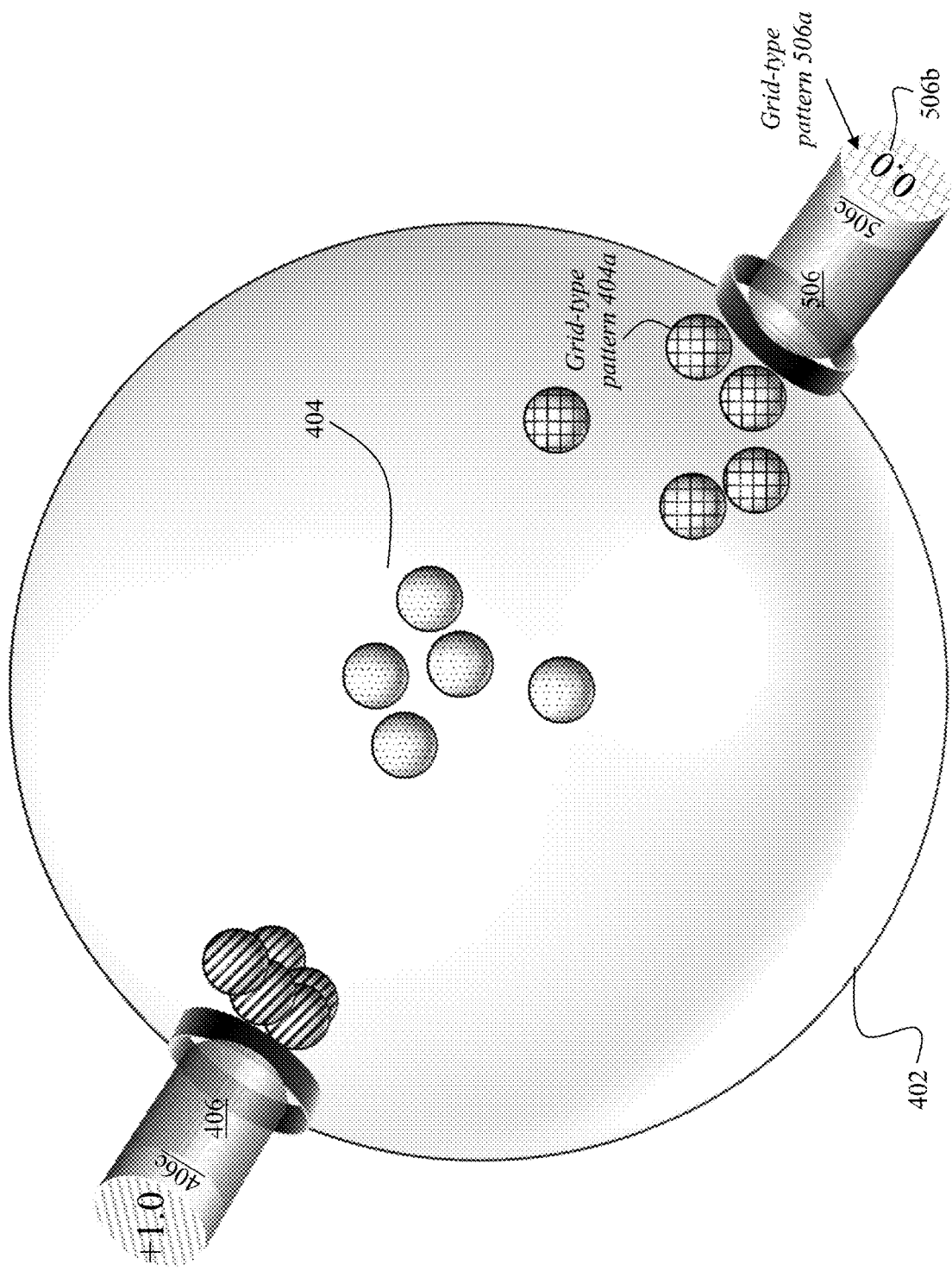

FIGS. 5A to 5E comprise diagrams that show an exemplary placement of a second virtual magnet 506 on an exterior surface of a virtual container 402 to attract virtual objects 504 within the virtual container 402 and adjustment of the attraction value 506b of the second virtual magnet 506, using the system 100 of FIG. 1. Similar to the process depicted in FIGS. 4A to 4F, the user in FIG. 5A can attach a second virtual magnet 506 to the exterior surface of the virtual container 402 at a different location than the first magnet 406. The second virtual magnet 506 comprises a data filter value corresponding to a grid-type pattern 506a and has an attraction value 506b of 0.0. Once the second magnet is attached to the container 402, the 3D objects 404a that match the data filter value 506a of the second magnet (i.e., because they have a grid-type pattern) are attracted to the second magnet 506 and begin moving toward the location of the second magnet as shown in FIG. 5B. The matching objects 404a have completed their movement in FIG. 5C.

Figure 5D:
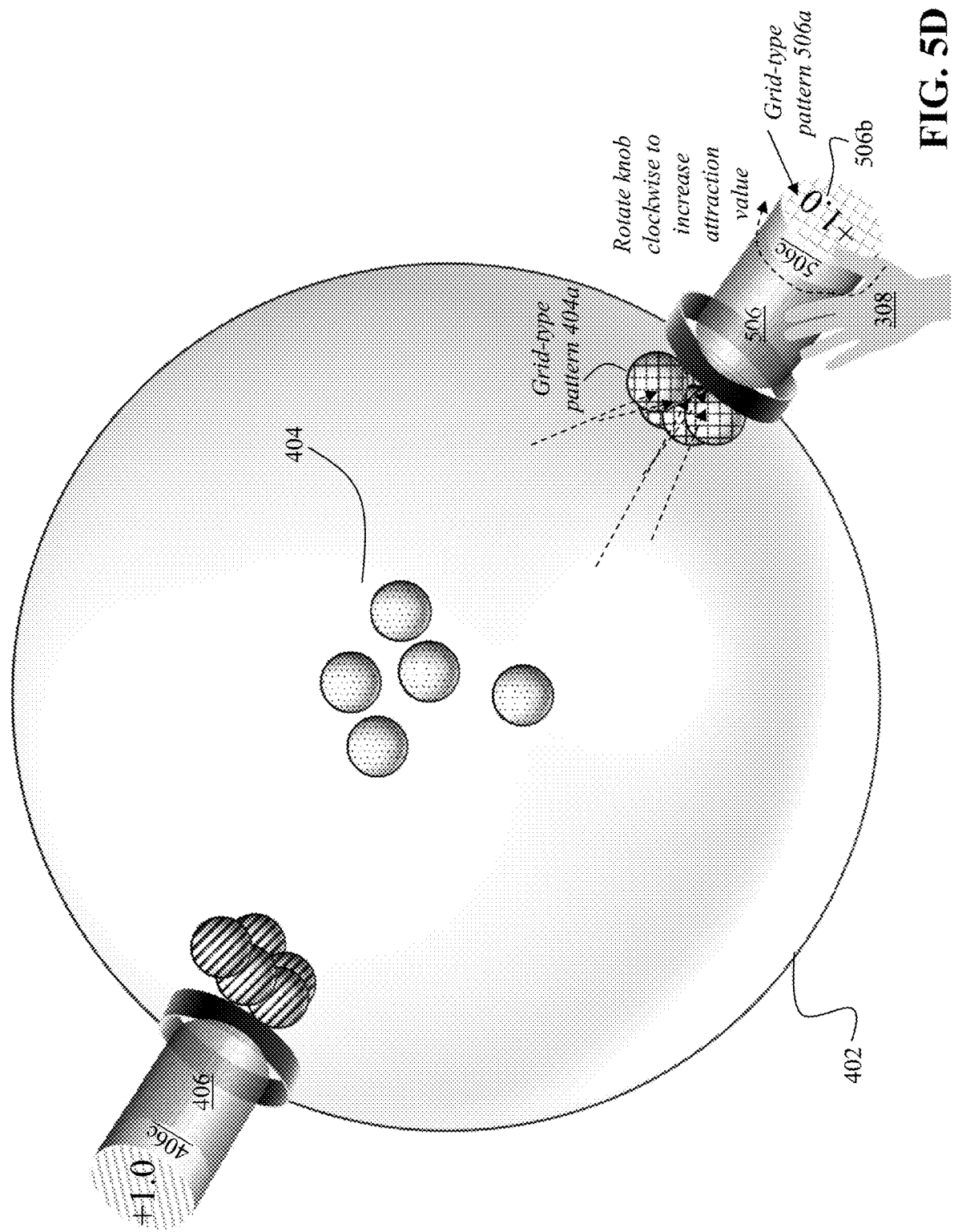
Figure 5E:
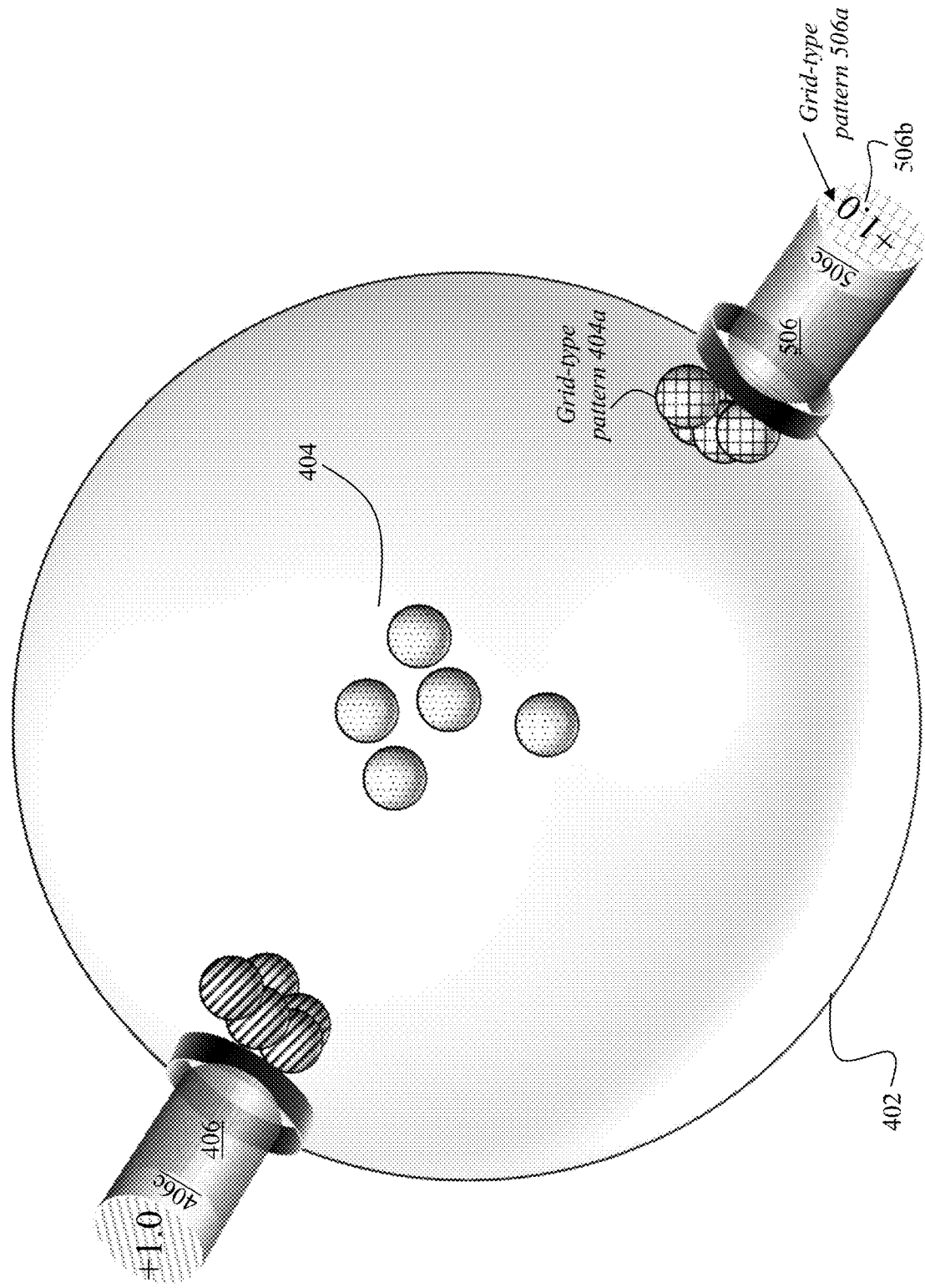

Turning to FIG. 5D, the user then rotates the knob 506c on the second magnet 506 to increase the attraction value 506b to +1.0, which causes the associated matching 3D objects 404a to move closer together in a tight sphere near the second magnet 506—as shown in FIG. 5E. The virtual environment rendering module 106 and the data visualization and exploration module 108 update the 3D virtual environment based upon the determined movement, for display to the user of the alternative reality viewing device 102. In this fashion, the system 100 provides a beneficial methodology over existing data visualization systems, in that the system 100 provides an intuitive and dynamic way to visually explore large, multi-faceted data sets according to customized filter criteria represented by virtual magnets.

In some embodiments, the server computing device 104 can capture or record each of the user's actions and corresponding movements of the 3D objects in the virtual container for, e.g., subsequent playback. In one example, the server computing device 104 can record the particular attachment of magnet(s), adjustment of attraction value(s), and corresponding movement of the 3D objects to generate a playback animation for the actions performed by the user. In this way, the same user and/or other users can view the data exploration and manipulation performed by the user at a later time.

Another important aspect of the methods and systems described herein is the ability for the system 100 to automatically update the data elements that are represented in the 3D virtual environment and to adjust the corresponding 3D objects on-the-fly. For example, the data visualization and exploration module 108 can periodically retrieve updated data elements, and/or changes attributes for the data elements, from databases 110a-110n. Then, the virtual environment rendering module 106 and the data visualization and exploration module 108 can automatically update the virtual environment being displayed to the user, to provide for dynamic animation of the 3D objects over time. For example, in a scenario where the 3D objects represent companies and their corresponding stock prices during a trading day, a user might attach a magnet that attracts companies whose stock prices have increased during the day and another magnet that attracts companies whose stock prices have decreased during the day. The databases 110a-110n can store real-time market data, which is retrieved continually by the data visualization and exploration module 108 for determining movement of the 3D objects in the virtual container and rendering by the virtual environment rendering module 106 of animations that show the movement of the 3D objects. In this case, when a company's stock price goes up, the corresponding 3D object can be shown to move closer to the first magnet, then later—as the company's stock price decreases, the corresponding 3D object can be shown to move closer to the second magnet, thereby producing a visual representation in 3D space of the company's stock price movement over time. In some cases, the virtual environment rendering module 106 can visually track the movement of one or more 3D objects (using, e.g., a tracing line) so that the user can view the starting position, movement positions, and ending position of the 3D object.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the technology described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for generating and manipulating three-dimensional (3D) objects in a 3D environment of an alternative reality software application, the system comprising:
   a display device for displaying a 3D virtual environment, the 3D virtual environment comprising a virtual container;
   a control device for interacting with the 3D virtual environment; and
   a server computing device coupled to the display device and the control device, the server computing device comprising a memory for storing computer executable instructions and a processor that executes the computer executable instructions to:
      retrieve, based upon input from the control device, a data set comprising a plurality of data elements, each data element having one or more attributes;
      generate, for each of the data elements, a virtual object in the 3D virtual environment, each virtual object positioned inside the virtual container and located in proximity to a center of the virtual container;
      attach, based upon input from the control device, one or more virtual magnets to an exterior surface of the virtual container, each virtual magnet associated with a data filter value and an attraction value;
      determine, for each virtual object, a movement distance and a movement speed in relation to the attachment position of each virtual magnet on the exterior surface of the virtual container based upon the data filter value and the attraction value for the virtual magnet; and
      move at least a portion of the virtual objects to a new location in the 3D virtual environment based upon the determined movement distance and movement speed for each virtual object.

2. The system of claim 1, wherein retrieving a data set comprising a plurality of data elements comprises:
   generating one or more virtual database objects in the 3D virtual environment;
   selecting, based upon input from the control device, one of the virtual database objects; and
   retrieving the data set comprising the plurality of data elements from a database based upon the selected virtual database object.

3. The system of claim 1, wherein the server computing device:
   adjusts, based upon input from the control device, the attraction value for one of the virtual magnets;
   determines, for each virtual object, a second movement distance and a second movement speed in relation to the attachment position of the adjusted virtual magnet on the exterior surface of the virtual container based upon the changed attraction value for the virtual magnet; and
   moves at least a portion of the virtual objects to a second new location in the 3D virtual environment based upon the second movement distance and second movement speed for each virtual object.

4. The system of claim 1, wherein the virtual objects are arranged with each other in the 3D virtual environment based upon a relationship between the one or more attributes of the data element corresponding to each virtual object.

5. The system of claim 4, wherein when moving in the 3D virtual environment, the virtual objects maintain their arrangement with each other.

6. The system of claim 1, wherein after at least a portion of the virtual objects have moved to a new location in the 3D virtual environment, the server computing device:

selects, based upon input from the control device, a portion of the virtual objects; and generates a new 3D virtual environment comprising a new container, the selected virtual objects positioned inside the new virtual container and located in proximity to a center of the new virtual container.

7. The system of claim 6, wherein the server computing device saves the data elements of the selected virtual objects in a database as a new data set.

8. The system of claim 1, wherein the server computing device:

determines, for each virtual object, a change in orientation in relation to the attachment position of each virtual magnet on the exterior surface of the virtual container based upon a change in the attraction value for the virtual magnet; and adjusts an orientation of at least a portion of the virtual objects in the 3D virtual environment based upon the determined change in orientation for each virtual object.

9. The system of claim 1, wherein the server computing device:

detects a change to the one or more attributes of the data elements associated with at least a portion of the virtual objects;

determines, for each virtual object, a new movement distance and a new movement speed in relation to the attachment position of each virtual magnet on the exterior surface of the virtual container based upon the data filter value and the attraction value for the virtual magnet; and moves at least a portion of the virtual objects to a new location in the 3D virtual environment based upon the determined new movement distance and new movement speed for each virtual object.

10. The system of claim 1, wherein the one or more virtual magnets are attached to the exterior surface of the virtual container at different positions.

11. The system of claim 1, wherein the server computing device:

attaches, based upon input from the control device, one of the virtual magnets to a new position on the exterior surface of the virtual container;

determines, for each virtual object, a new movement distance and a new movement speed in relation to the new attachment position of each virtual magnet on the exterior surface of the virtual container based upon the data filter value and the attraction value for the virtual magnet; and moves at least a portion of the virtual objects to a new location in the 3D virtual environment based upon the determined new movement distance and new movement speed for each virtual object.

12. The system of claim 1, wherein the display device is a virtual reality (VR) headset and the control device is a VR controller.

13. The system of claim 1, wherein the one or more virtual magnets each comprises a virtual knob that displays the attraction value associated with the virtual magnet.

14. The system of claim 13, wherein the server computing device:

turns the virtual knob based upon input from the control device; and changes the attraction value associated with the virtual magnet based upon the turning of the virtual knob.

15. A computerized method of generating and manipulating three-dimensional (3D) objects in a 3D environment of an alternative reality software application, the method comprising:

displaying, by a display device, a 3D virtual environment, the 3D virtual environment comprising a virtual container;

providing, by a control device, input for interacting with the 3D virtual environment;

retrieving, by a server computing device coupled to the display device and the control device, based upon input from the control device, a data set comprising a plurality of data elements, each data element having one or more attributes;

generating, by the server computing device for each of the data elements, a virtual object in the 3D virtual environment, each virtual object positioned inside the virtual container and located in proximity to a center of the virtual container;

attaching, by the server computing device based upon input from the control device, one or more virtual magnets to an exterior surface of the virtual container, each virtual magnet associated with a data filter value and an attraction value;

determining, by the server computing device for each virtual object, a movement distance and a movement speed in relation to the attachment position of each virtual magnet on the exterior surface of the virtual container based upon the data filter value and the attraction value for the virtual magnet; and moving, by the server computing device, at least a portion of the virtual objects to a new location in the 3D virtual environment based upon the determined movement distance and movement speed for each virtual object.

16. The method of claim 15, wherein retrieving a data set comprising a plurality of data elements comprises:

generating one or more virtual database objects in the 3D virtual environment;

selecting, based upon input from the control device, one of the virtual database objects; and retrieving the data set comprising the plurality of data elements from a database based upon the selected virtual database object.

17. The method of claim 15, wherein the server computing device:

adjusts, based upon input from the control device, the attraction value for one of the virtual magnets;

determines, for each virtual object, a second movement distance and a second movement speed in relation to the attachment position of the adjusted virtual magnet on the exterior surface of the virtual container based upon the changed attraction value for the virtual magnet; and moves at least a portion of the virtual objects to a second new location in the 3D virtual environment based upon the second movement distance and second movement speed for each virtual object.

18. The method of claim 15, wherein the virtual objects are arranged with each other in the 3D virtual environment based upon a relationship between the one or more attributes of the data element corresponding to each virtual object.

19. The method of claim 18, wherein when moving in the 3D virtual environment, the virtual objects maintain their arrangement with each other.

20. The method of claim 15, wherein after at least a portion of the virtual objects have moved to a new location in the 3D virtual environment, the server computing device:

selects, based upon input from the control device, a portion of the virtual objects; and generates a new 3D virtual environment comprising a new container, the selected virtual objects positioned inside the new virtual container and located in proximity to a center of the new virtual container.

21. The method of claim 20, wherein the server computing device saves the data elements of the selected virtual objects in a database as a new data set.

22. The method of claim 15, wherein the server computing device:

determines, for each virtual object, a change in orientation in relation to the attachment position of each virtual magnet on the exterior surface of the virtual container based upon a change in the attraction value for the virtual magnet; and adjusts an orientation of at least a portion of the virtual objects in the 3D virtual environment based upon the determined change in orientation for each virtual object.

23. The method of claim 15, wherein the server computing device:

detects a change to the one or more attributes of the data elements associated with at least a portion of the virtual objects;

determines, for each virtual object, a new movement distance and a new movement speed in relation to the attachment position of each virtual magnet on the exterior surface of the virtual container based upon the data filter value and the attraction value for the virtual magnet; and moves at least a portion of the virtual objects to a new location in the 3D virtual environment based upon the determined new movement distance and new movement speed for each virtual object.

24. The method of claim 15, wherein the one or more virtual magnets are attached to the exterior surface of the virtual container at different positions.

25. The method of claim 15, wherein the server computing device:

attaches, based upon input from the control device, one of the virtual magnets to a new position on the exterior surface of the virtual container;

determines, for each virtual object, a new movement distance and a new movement speed in relation to the new attachment position of each virtual magnet on the exterior surface of the virtual container based upon the data filter value and the attraction value for the virtual magnet; and moves at least a portion of the virtual objects to a new location in the 3D virtual environment based upon the determined new movement distance and new movement speed for each virtual object.

26. The method of claim 15, wherein the display device is a virtual reality (VR) headset and the control device is a VR controller.

27. The method of claim 15, wherein the one or more virtual magnets each comprises a virtual knob that displays the attraction value associated with the virtual magnet.

28. The method of claim 27, wherein the server computing device:

turns the virtual knob based upon input from the control device; and changes the attraction value associated with the virtual magnet based upon the turning of the virtual knob.

29. A computerized method of generating and manipulating three-dimensional (3D) objects in a 3D environment of an alternative reality software application, the method comprising:

retrieving, by a server computing device, based upon input from a control device, a data set comprising a plurality of data elements, each data element having one or more attributes;

generating, by the server computing device for each of the data elements, a virtual object in the 3D virtual environment, each virtual object positioned inside the virtual container and located in proximity to a center of the virtual container;

attaching, by the server computing device based upon input from the control device, one or more virtual magnets to an exterior surface of the virtual container, each virtual magnet associated with a data filter value and an attraction value;

determining, by the server computing device for each virtual object, a movement distance and a movement speed in relation to the attachment position of each virtual magnet on the exterior surface of the virtual container based upon the data filter value and the attraction value for the virtual magnet; and moving, by the server computing device, at least a portion of the virtual objects to a new location in the 3D virtual environment based upon the determined movement distance and movement speed for each virtual object.

* * * * *